United States Patent
Ming

(10) Patent No.: US 9,858,476 B1
(45) Date of Patent: Jan. 2, 2018

(54) METHOD FOR RECOGNIZING TABLE, FLOWCHART AND TEXT IN DOCUMENT IMAGES

(71) Applicant: KONICA MINOLTA LABORATORY U.S.A., INC., San Mateo, CA (US)

(72) Inventor: Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 36 days.

(21) Appl. No.: 15/199,298

(22) Filed: Jun. 30, 2016

(51) Int. Cl.
    G06K 9/00 (2006.01)
(52) U.S. Cl.
    CPC ..... *G06K 9/00456* (2013.01); *G06K 9/00449* (2013.01); *G06K 9/00463* (2013.01)
(58) Field of Classification Search
    None
    See application file for complete search history.

(56) References Cited

U.S. PATENT DOCUMENTS

| | | | |
|---|---|---|---|
| 5,813,018 A | 9/1998 | Kaji et al. | |
| 9,135,517 B1* | 9/2015 | Adams | G06K 9/00463 |
| 2004/0042677 A1* | 3/2004 | Lee | G06K 9/00456 382/254 |
| 2012/0274991 A1* | 11/2012 | Roy | H04N 1/387 358/462 |
| 2014/0169678 A1* | 6/2014 | Chulinin | G06K 9/46 382/195 |
| 2014/0270536 A1* | 9/2014 | Amtrup | G06K 9/00442 382/195 |
| 2015/0262007 A1* | 9/2015 | Sesum | G06K 9/00469 382/177 |
| 2016/0011670 A1* | 1/2016 | Kamamori | G06F 3/017 345/173 |

OTHER PUBLICATIONS

Kasturi et al., "A System for Interpretation of Line Drawings", IEEE Transactions on Pattern Analysis and Machine Intelligence, vol. 12, No. 10, Oct. 1990.

* cited by examiner

*Primary Examiner* — Delomia L Gilliard
(74) *Attorney, Agent, or Firm* — Chen Yoshimura LLP

(57) ABSTRACT

A method for recognizing a binary document image as a table, pure text, or flowchart includes calculating a side profile of the image for each of the four sides, calculating a boundary removal size N corresponding to each side based on widths of lines or strokes closest to that side, and for each side, removing a boundary of size N from the document image, and re-calculating the side profile for each side after the removal. Then, based on a comparison of the side profiles and the re-calculated side profiles, the input document image is recognized as a table if all side profiles change from smooth to non-smooth, as pure text if the side profile changes are small, and as a flowchart if the original side profiles contain multiple sharp changes and wide flat regions and if the side profile changes significantly in the previously wide flat regions.

20 Claims, 23 Drawing Sheets

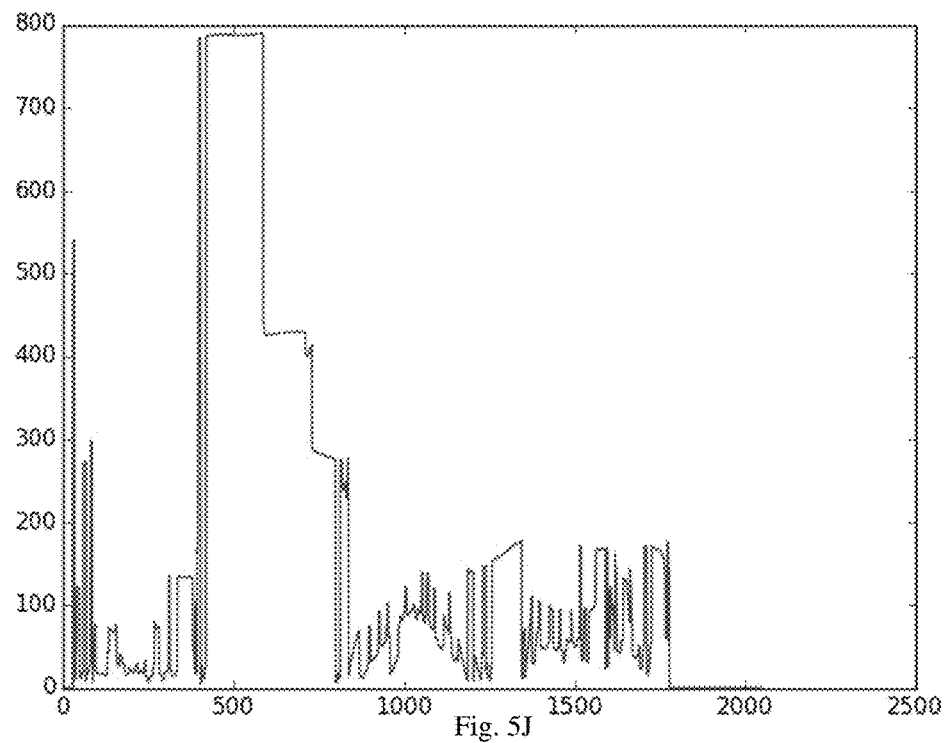

Our mission is the Creation of New Value
Our mission is the creation of New Value.
Our mission is the creation of New Value.
Our mission is the creation of New Value.
Our mission is the Creation of New value.
Our mission is the creation of New Value.
Our mission is the creation of New Value.
Our mission is the creation of New Value

Fig. 6A

METHOD FOR RECOGNIZING TABLE, FLOWCHART AND TEXT IN DOCUMENT IMAGES

BACKGROUND OF THE INVENTION

Field of the Invention

This invention relates to document image processing, and in particular, it relates to a method for recognizing table, flowchart and pure text in a document image.

Description of Related Art

Document images refer to digital images that represent documents. A document image may be generated by scanning or photographing a hardcopy document, or capturing whiteboard, or generated from other electronic data such as a word processing document. The contents of a document image may include pure text, tables, flowcharts, other graphics such as barcodes, logos, charts, etc., and images such as photos. Flowcharts refer to charts that contain text enclosed in polygons or other shaped boundaries, lines pointing from one boundary to another, etc. Tables are typically rectangular shaped objects with horizontal and vertical lines diving the table into cells. Document image segmentation refers to a process in document image processing where these different types of contents are recognized and separated from each other into sub-images containing only one type of content so that they can be subsequently processed, for example, to extract text using OCR (optical character recognition), etc. Various document segmentation techniques are known. In some document images, especially those generated from hand-written documents, some graphic objects may be deformed, e.g. the lines may be not straight or not vertical or horizontal, and it can be challenging to correctly recognize different types of contents such as tables, flowcharts, etc. in such document images.

Various algorithms have been proposed to recognize table, flowchart and text based on different characteristics of each type. Table recognition may be based on detecting straight line segments using Hough transform or other line detectors. However, in cases of hand-written documents, since there is no guarantee that the four boundaries of a table will be straight line segments, line detector based approach can be unstable, and computationally heavy and complicated analyses may be required. Some connected component based method can be unstable in the case of empty tables, or when part of the text overlap line segments of the table. For text recognition, texture based analyses using connected component (CC) size, CC area ratio, etc., are known. For flowchart recognition, finding primitive shapes (polygons, etc.) and analyzing the relationship among them or among the CCs are often used techniques. The analysis is complicated when there are touching or un-touching flowchart components (shapes, lines, etc.). Further, conventional recognition approaches are commonly bottom-up in style, where the basic components are extracted first followed by analysis of those components. Thus, many restrictions exist, for example, some methods can only handle convex polygons, relatively straight lines, etc. Also different features are used to analyze different type of objects.

SUMMARY

Accordingly, the present invention is directed to methods and related apparatus for recognizing tables, flowcharts, and text that substantially obviate one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for recognizing an input document image as a table, pure text, or flowchart, the document image being a binary image where each pixel is a background pixel having a background pixel value or a content pixel having a content pixel value, the method comprising: (a) calculating a side profile of the image for each of a top, bottom, left and right sides, each side profile being, for each pixel position along that side of the document image, a distance from that side to a first content pixel along a direction perpendicular to that side; (b) calculating a boundary removal size N corresponding to each side based on line widths at a plurality of pixel positions along that side using content pixels closest to that side; (c) for each side, removing a boundary of the size N from the document image by setting N consecutive pixels, starting from the first content pixel and going in the direction perpendicular to that side, to the background pixel value, to generate a boundary-removed image for that side; (d) re-calculating a side profile for each of the top, bottom, left and right sides using the boundary-removed image for that side; (e) based on a comparison of the side profiles and the re-calculated side profiles of some or all of the sides, recognizing the input document image as a table, pure text, a flowchart, or none of them.

In one embodiment, step (e) includes: determining whether each side profile is a smooth curve or fits a straight line; determining whether each re-calculated side profile is a smooth curve or fits a straight line; calculating a profile difference curve for each side by subtracting the side profile for that side from the re-calculated side profile for that side; detecting near-zero valleys of each profile difference curve, each near-zero valley being a region of the respective profile difference curve where values of the profile difference curve for at least T1 consecutive pixel position are below a value T2, T1 and T2 being predetermined threshold values; and recognizing the input image as a table if: (1) each side profile is a smooth curve or fits a straight line, (2) none of the re-calculated side profiles is a smooth curve or fits a straight line, and (3) for at least one pair of profile difference curves of opposing sides, their respective numbers and locations of near-zero valleys agree with each other within predetermined criteria.

In one embodiment, the predetermined criteria are, for each pair of profile difference curves of opposing sides: either the pair of profile difference curves have identical numbers of near-zero valleys, or the pair of profile difference curves have numbers of near-zero valleys that are different from each other by no more than a threshold T3, and have more than a threshold T4 of matching pairs of near-zero valleys, each matching pair of near-zero valleys belonging respectively to the pair of profile difference curves and being located within predetermined vicinities from each other.

In one embodiment, step (e) includes: calculating a profile difference curve for each side by subtracting the side profile for that side from the re-calculated side profile for that side; and recognizing the input image as pure text if, for each of least two of the sides, a number of pixel positions where the profile difference curve has a value smaller than a threshold T5 is greater than a threshold T6, wherein the threshold T5 is equal to the boundary removal size N plus a predetermined value, and wherein the threshold T6 is a predetermined fraction of a total number of pixels along that side.

In one embodiment, step (e) includes: for each side profile, determining whether the side profile contains multiple sharp changes and multiple wide flat regions having substantially different widths; calculating a profile difference curve for each side by subtracting the side profile for that side from the re-calculated side profile for that side; and recognizing the input image as pure text if, for each of the sides, either (1) in a region corresponding to one of the wide flat regions of the side profile, the profile difference curve has values larger than a predetermined value, or (2) compared to the corresponding side profile, the re-calculated side profile has more regions where the re-calculated side profile value is a maximum profile value equal to a size of the image in the direction perpendicular to that side.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 5A-5K illustrate an example of a flowchart image and the result of various processing steps in a flowchart recognition method according to embodiments of the present invention.

FIGS. 6A-6K illustrate an example of a text image and the result of various processing steps in a text recognition method according to embodiments of the present invention.

DETAILED DESCRIPTION OF PREFERRED EMBODIMENTS

Embodiments of the present invention use a side profile based approach to recognize objects (different types of contents) in document images for purpose of document segmentation. The method is based on certain global characteristics of various objects, and classifies objects using such characteristics. The method can be used to handle document images even when the shapes of table or flowchart are deformed.

Figure 8:
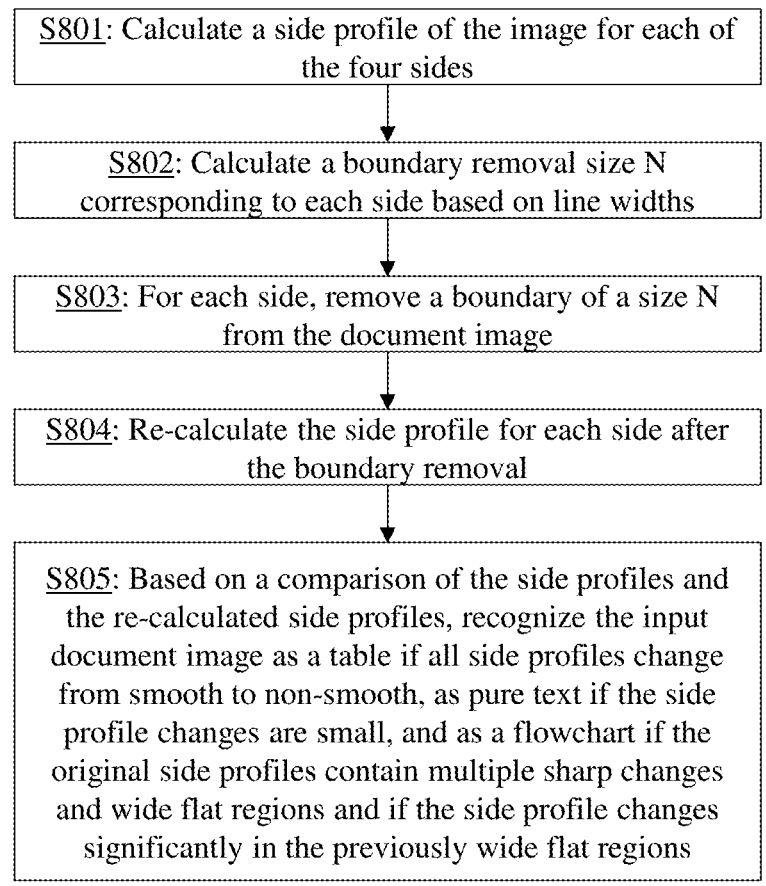
FIG. 8 schematically illustrates a process for recognizing tables, flowcharts and text in a document image according to embodiments of the present invention.

Stated generally, as shown in FIG. 8, the method includes calculating a side profile of the image for each of the four sides (step S801), calculating a boundary removal size N corresponding to each side based on line widths at a plurality of pixel positions along that side using content pixels closest to that side (step S802), and for each side, removing a boundary of size N (step S803), and re-calculating the side profile for each side after the removal (step S804). Then, based on a comparison of the side profiles and the re-calculated side profiles, the input document image is recognized as a table if all side profiles change from smooth to non-smooth, as pure text if the side profile changes are small, and as a flowchart if the original side profiles contain multiple sharp changes and wide flat regions and if the side profile changes significantly in the previously wide flat regions (step S805).

Figures 6B, 6C:
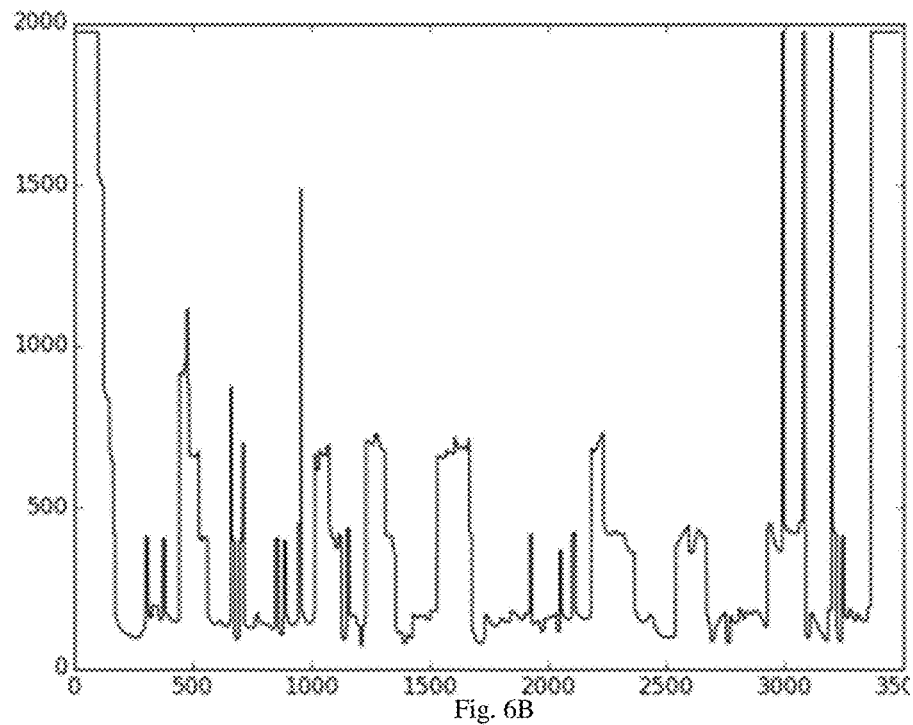
Figure 6D:
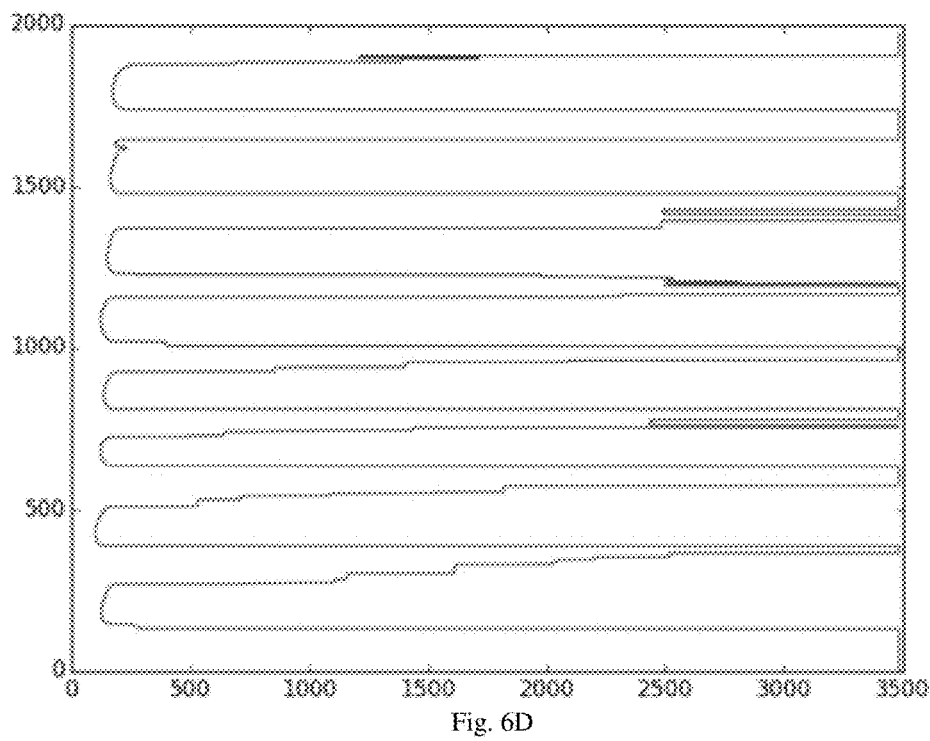
Figure 6E:
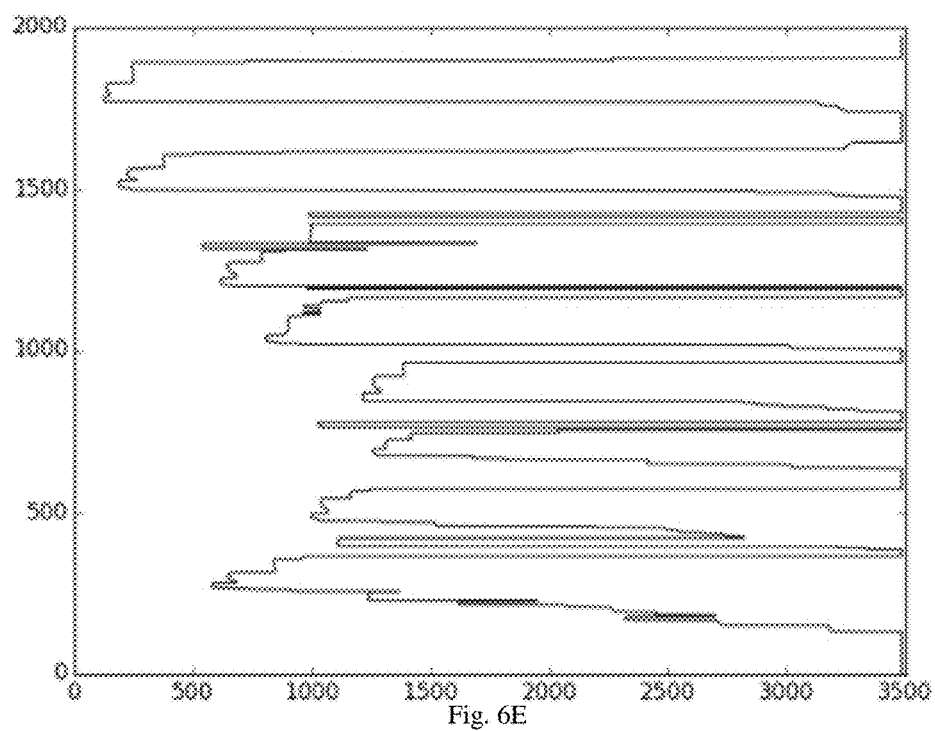
Figures 7A, 7L:
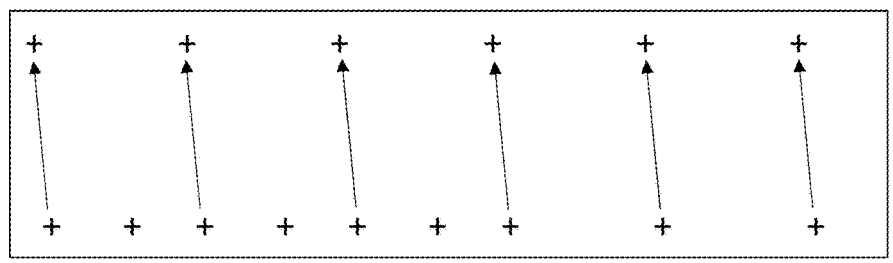
FIGS. 7A-7L illustrate an example of a table image and the result of various processing steps in a table recognition method according to embodiments of the present invention.
Figure 7B:
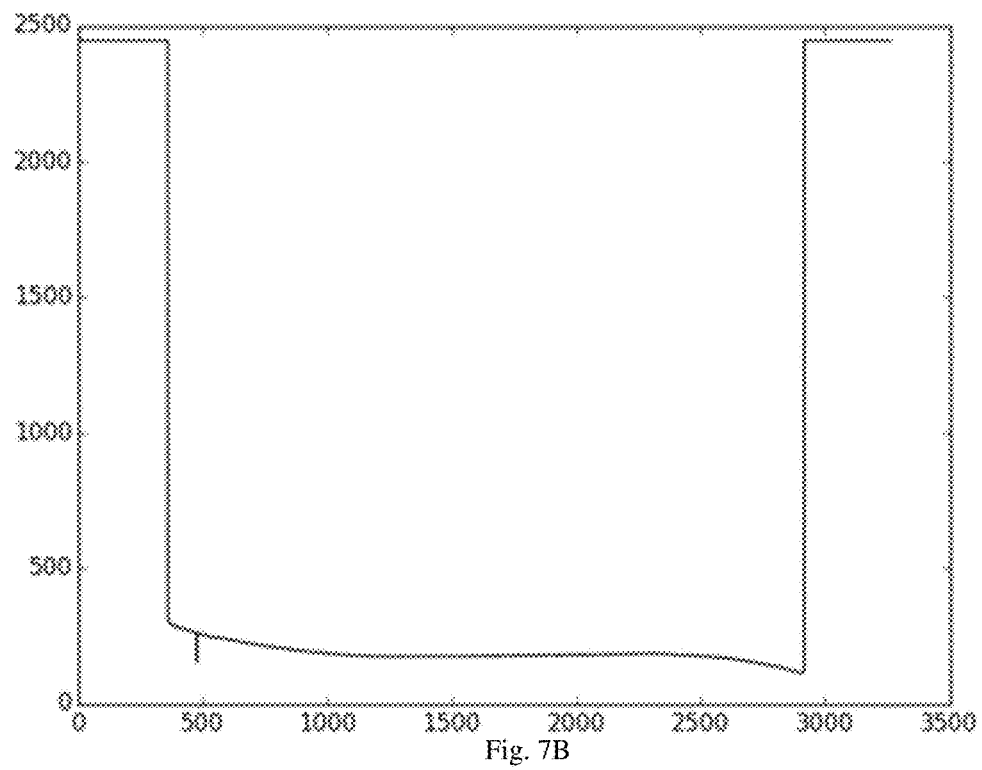
Figure 7C:
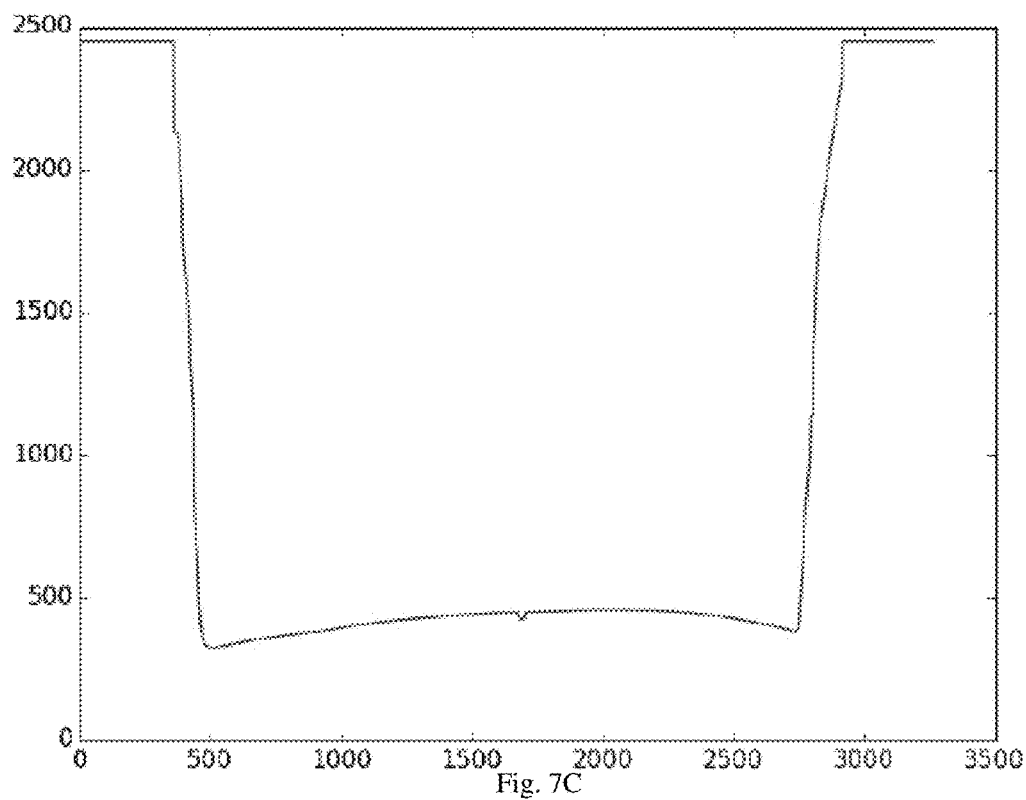
Figure 7D:
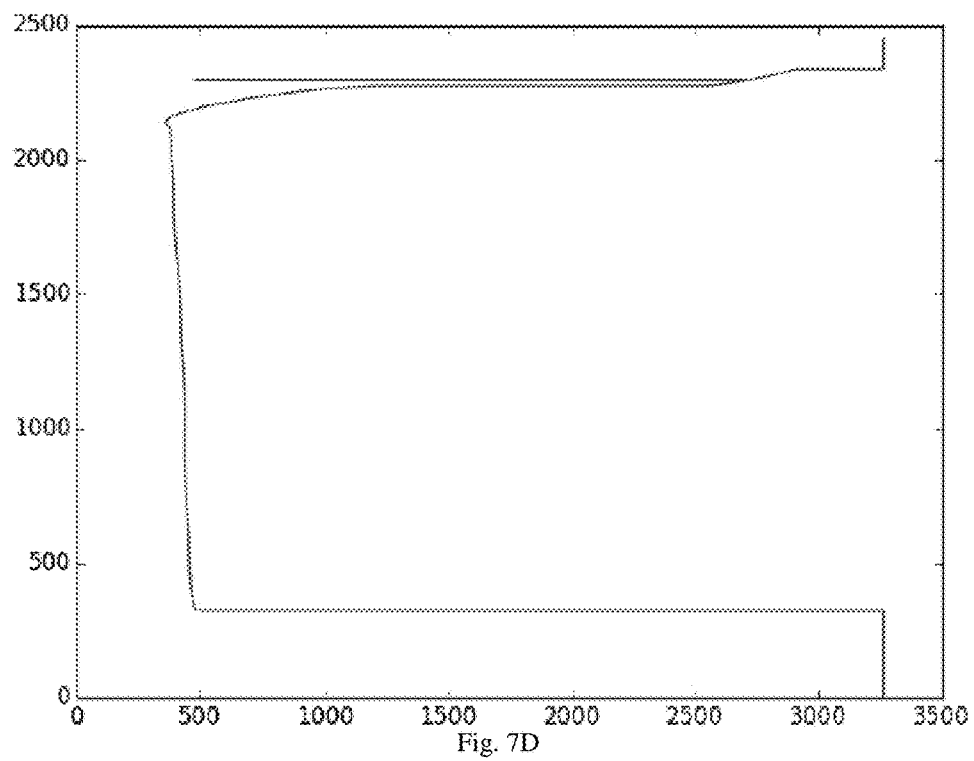
Figure 7E:
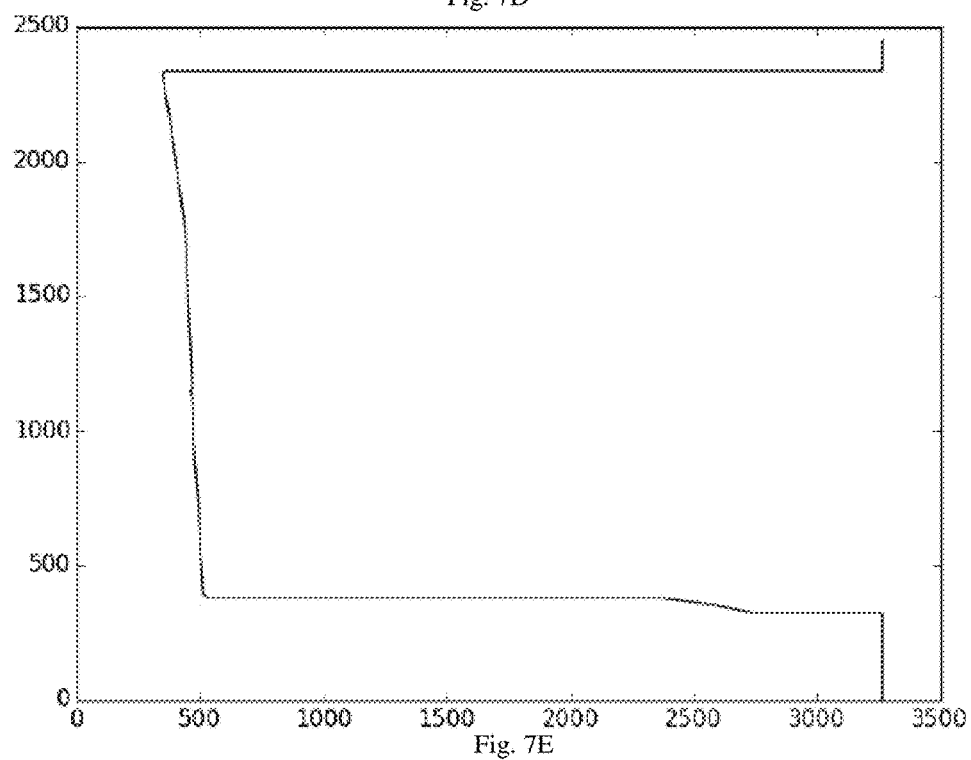

The embodiments of the present invention are described in more detail below using examples of a flowchart (FIG. 5A), pure text (FIG. 6A), and a table (FIG. 7A). It is noted that prior to applying the recognition methods, an original input document image has been processed to separate different types of contents, so each document image processed using the recognition method contains only one type of content, and the recognition method determines which type the content is.

Figure 1:
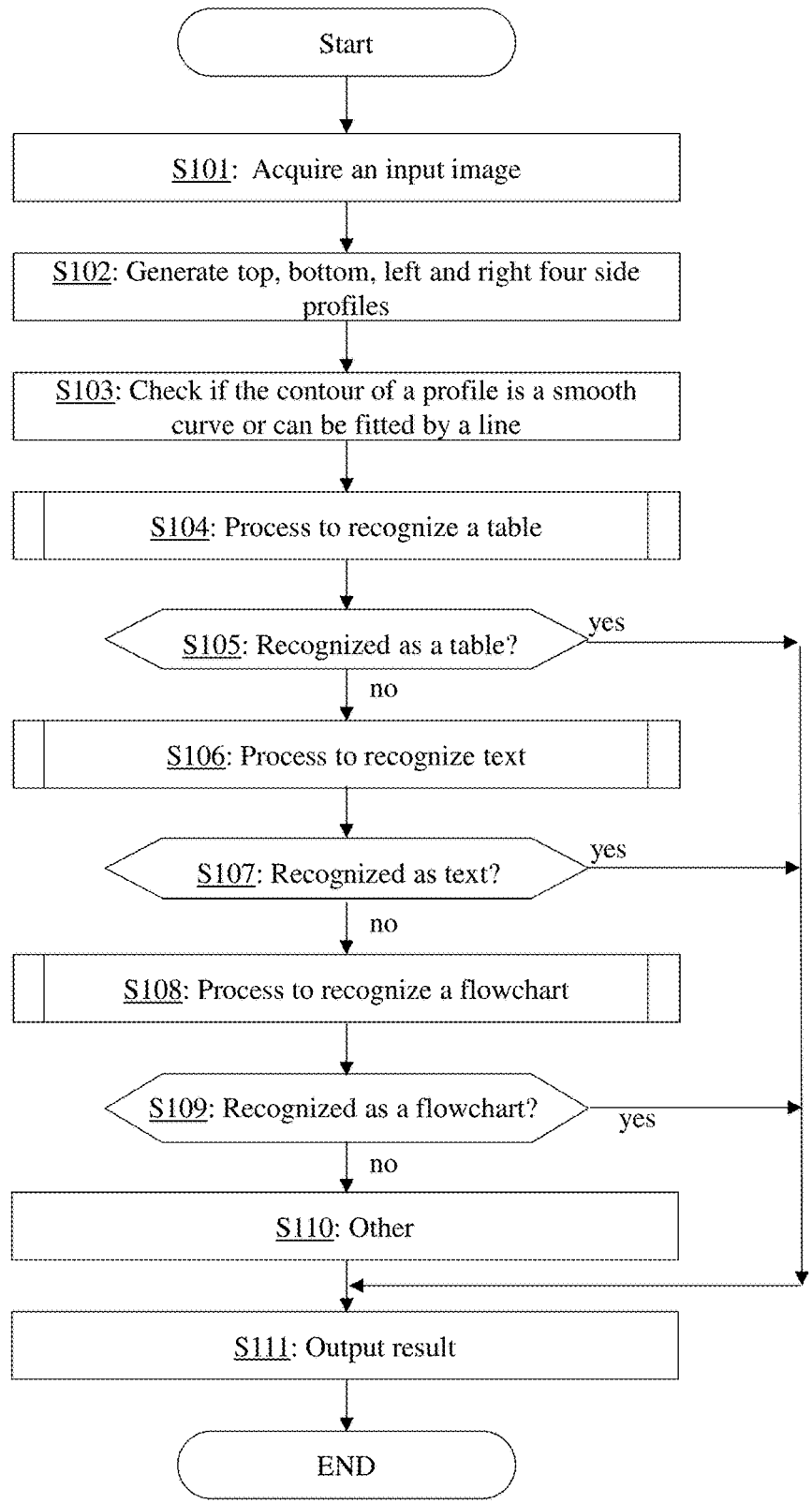
FIGS. 1-4 are flowcharts that schematically illustrate a process for recognizing tables, flowcharts and text in a document image according to embodiments of the present invention.
Figure 2:
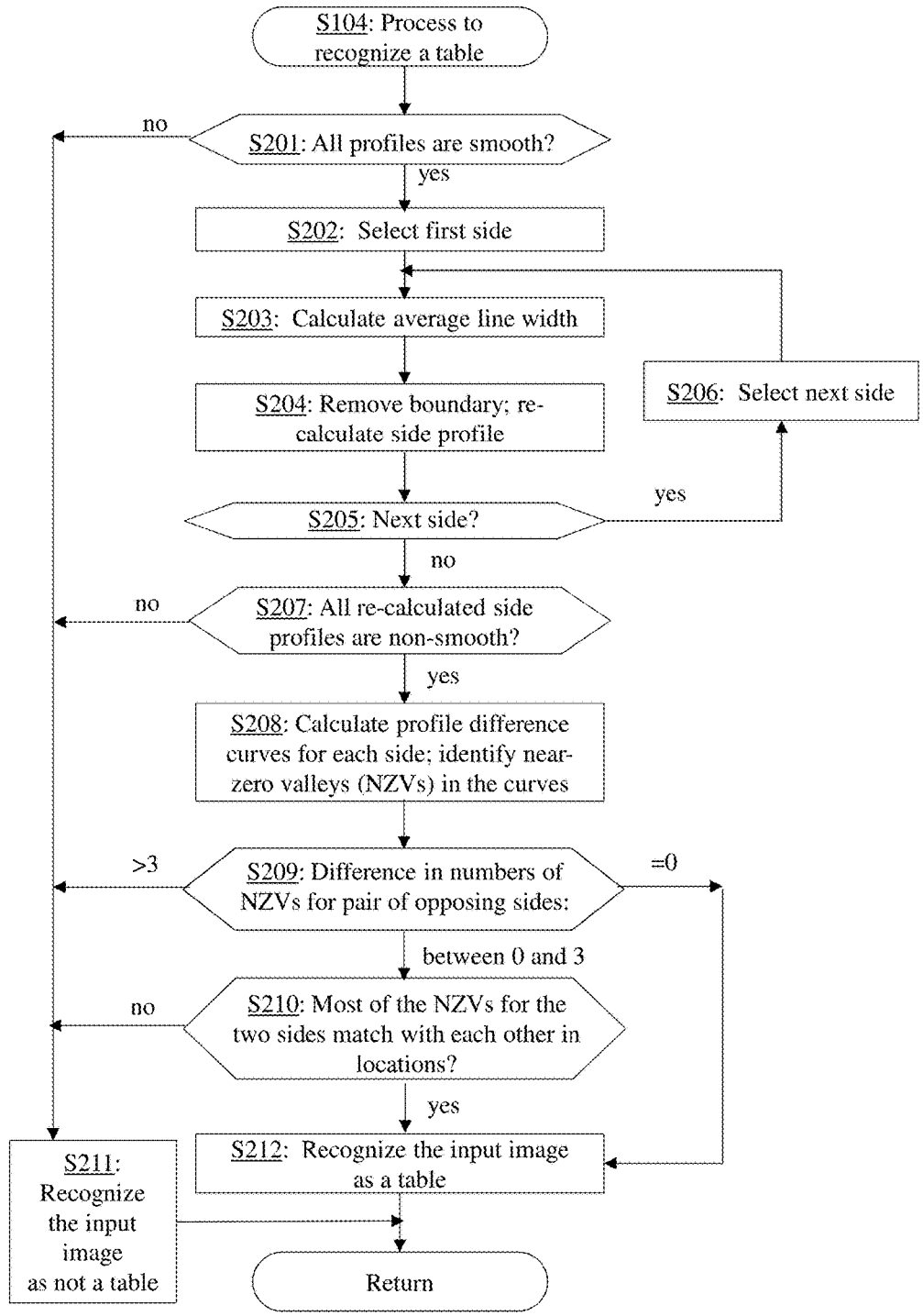

FIG. 1 schematically illustrates an overall flow of the document image processing method according to embodiments of the present invention, for recognizing various objects in the document image. First, an input digital document image is obtained (step S101). The document image is a binary image where each pixel has a value of either black or white. Here, it is assumed that the document background is white and document content is black, although the method described below can be readily modified for white content on black background.

Then, four side profiles are generated for the document image, namely the top, bottom, left and right side profiles (step S102). A side profile represents, for each pixel position along a side (top, bottom, left or right) of the document image, the distance from that side (edge of document) to the first black pixel (content pixel) along the direction perpendicular to that side. In one implementation, each side profile is a curve where one axis is the pixel position and the other axis is the distance to the first black pixel in the perpendicular direction. Step S102 may include smoothing each side profile.

Figure 5A:
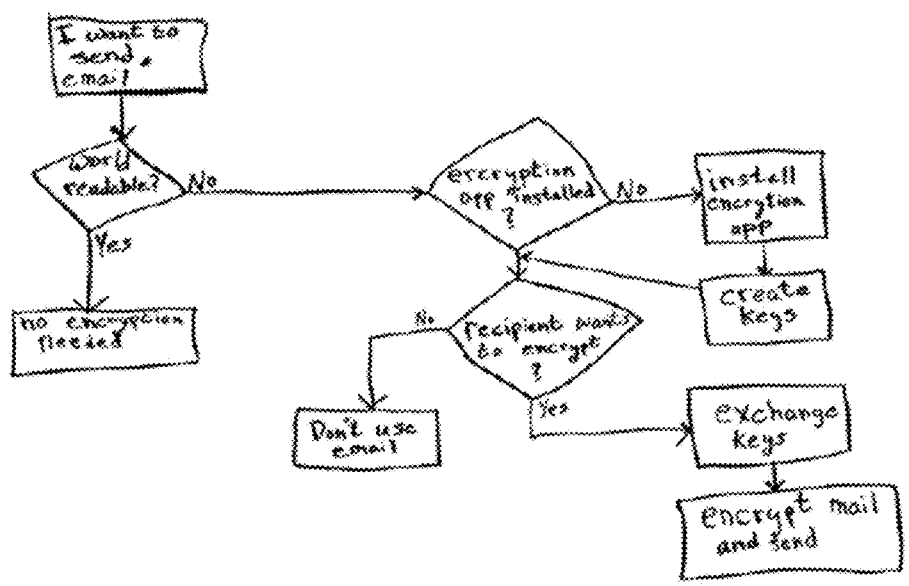
Figure 5B:
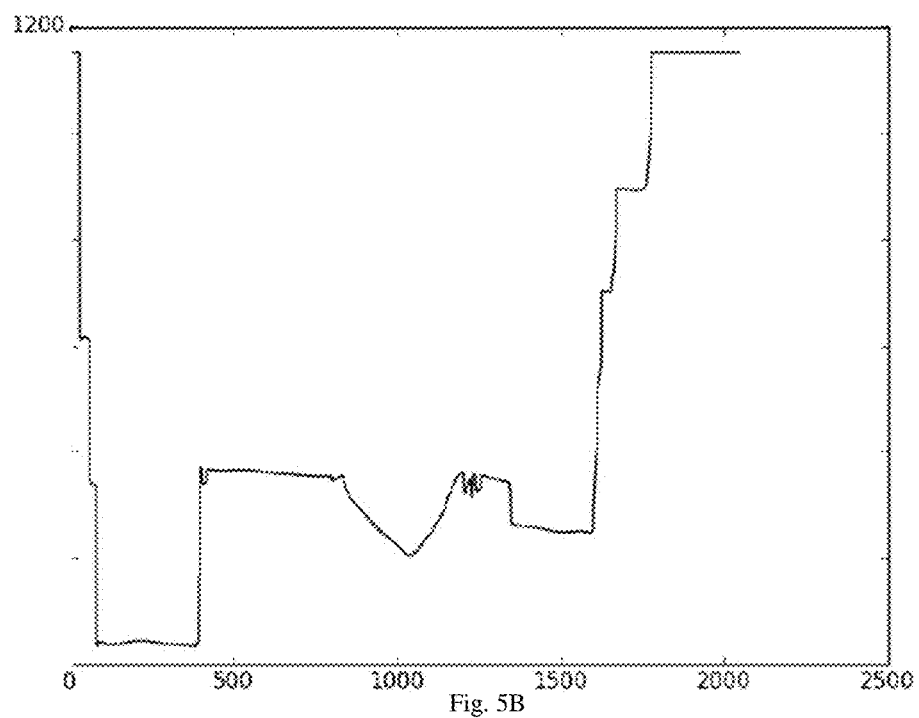
Figure 5C:
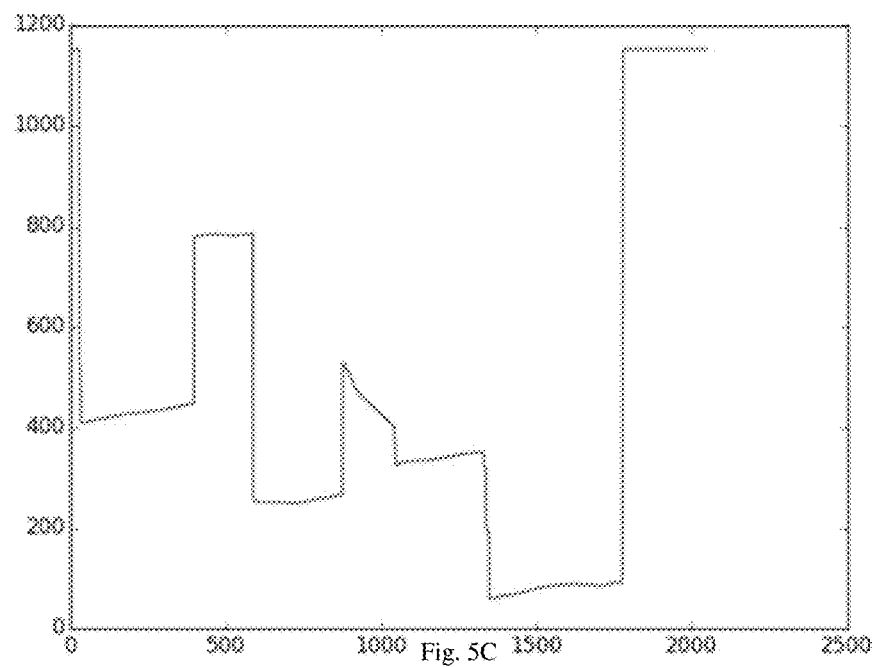
Figure 5D:
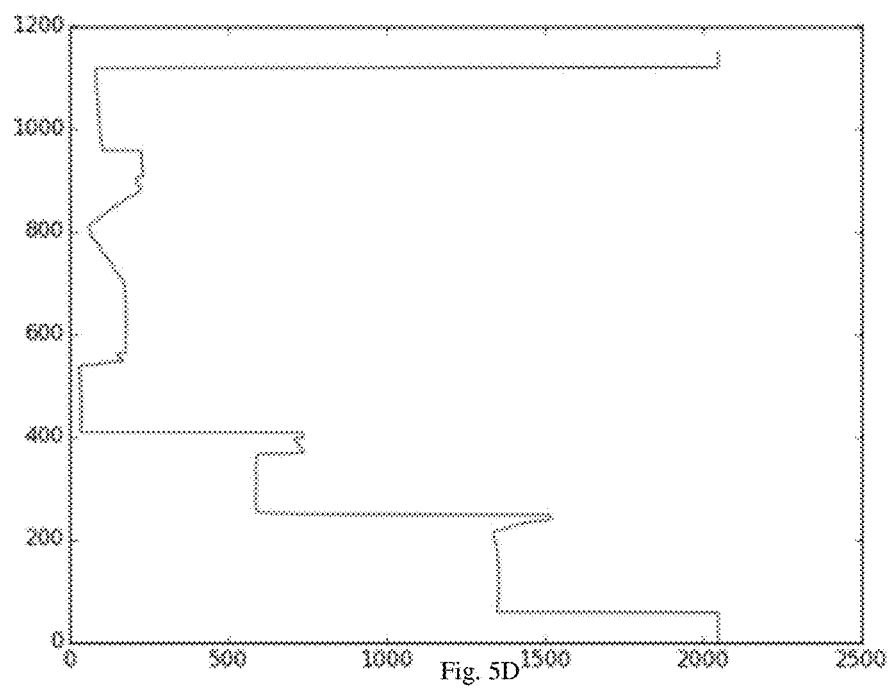
Figure 5E:
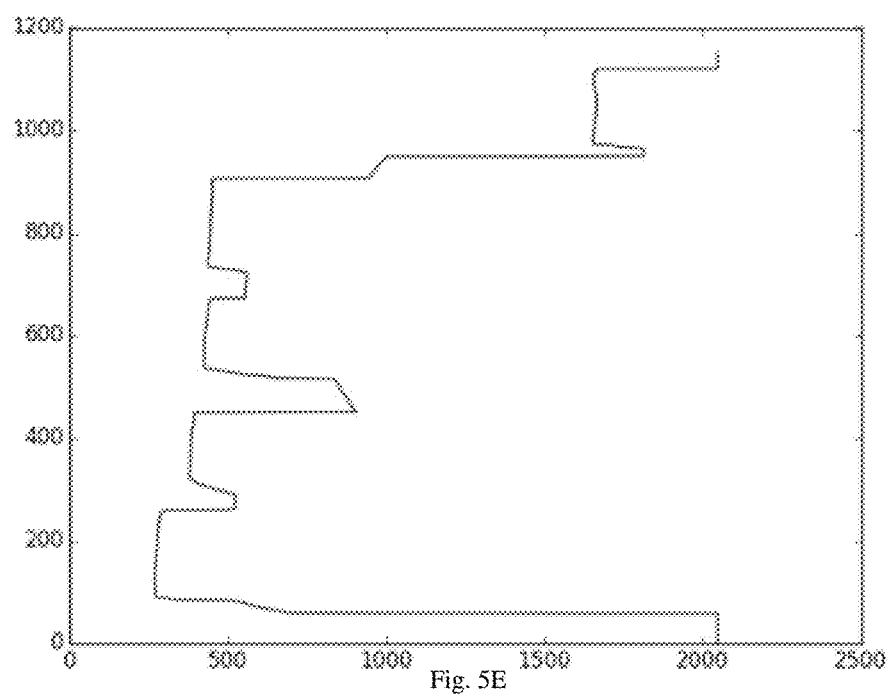

FIGS. 5B-5E illustrate top, bottom, left and right side profiles of the example in FIG. 5A (flowchart). FIGS. 6B-6E illustrate top, bottom, left and right side profiles of the example in FIG. 6A (text). FIGS. 7B-7E illustrate top, bottom, left and right side profiles of the example in FIG. 7A (table).

Then, for each side profile, it is determined whether the side profile is a smooth curve or can be fitted by a straight line (step S103). For example, to determine whether the side profile is a smooth curve, $\Delta d(x)=|d(x+n)-d(x)|$ is calculated, where $d(x)$ denotes the value of the side profile at pixel location $x$. If $\Delta d(x)$ for all $x$ values are less than a threshold D, then the profile is deemed smooth. The threshold D may be, for example, $(d_{max}-d_{min})/10$, where $d_{max}$ and $d_{min}$ are the maximum and minimum values of that profile. The parameter "n" for the above calculation may be, for example, 3 pixels. To determine whether the side profile can be fitted by a straight line, the maximum perpendicular offset of the fitting line (ex. less than 1/10 of the size of the respective side)

can used to evaluate the goodness of the line fit. Alternatively, a cost function such as least square error can also be used.

Process S104 is performed to determine whether the document image content is a table. Process S106 is performed to determine whether the document image content is pure text (i.e. text that is not a part of a table or flowchart). Process S108 is performed to determine whether the document image content is a flowchart. The details of processes S104, S106 and S108 are illustrated in FIGS. 2, 3 and 3A, and 4, respectively, which are described in turn below. If the determination in any of the processes S104, S106 and S108 is affirmative ("yes" in steps S105, S107, or S109), the result is output (step S111) and the image recognition process terminates. If the determination in none of the processes S104, S106 and S108 is affirmative, the image is deemed to be an "other" type (step S110) and the process terminates.

It should be noted that although in FIG. 1 the processes S104, S106, and S108 are shown as being performed in a particular order, the order of performing these processes is not limited. The algorithm in each of these processes does not depend on the performance or the determination results of the other ones of these processes.

In process S104, the table recognition algorithm is based on the following observation of tables: A table should have four boundary lines on the four sides. For each boundary line, there should be table lines intersecting that boundary line in the perpendicular direction, forming T-junctions, and these T-junctions contain information about the locations and sizes of columns and rows of the table. For a pair of opposing sides (top vs. bottom, or left vs. right), the number of T-junctions of the two sides should be the same and the locations of corresponding T-junctions on the two sides should be approximately the same, unless the table contains merged cells that affect the top or bottom rows or the left-most or right-most columns.

In process S104 (FIG. 2), using the result of step S103, it is first determined whether all four (top, bottom, left or right) side profiles are smooth (step S201). If they are not all smooth, then the image is determined not to be a table candidate (step S211) and the process returns. As seen in the example of FIGS. 7B-7E, the four side profiles are smooth for a table image, and as seen in the example of FIGS. 5B-5E and 6B-6E, the four side profiles are not smooth for a flowchart image or text image.

If all four side profiles are smooth, one side profile is selected (step S202), and a width W of line strokes for the selected side is calculated (step S203). The line width W may be an average of individual line width value at each pixel position along that side, using black pixels closest to that side. Here, the term "average" is used broadly to include mean, median, mode, and other suitable measures. For example, the line width for a side at a particular pixel position can be calculated by starting from that side at that pixel position, going in the perpendicular direction, finding the first black pixel, and finding the pixel run length in the perpendicular direction. The average may be calculated using the line width values for all pixel positions along that side, or by using a middle bracket of these individual values such as between 10-90 percentile, between 5-95 percentile, etc. If the image is a table, then the calculated average line width will be the average line width of the table boundary line closest to that side.

Then, using the document image, a boundary of a size N is removed from the selected side, where N is equal to the average line width W calculated in step S203 plus a small value $\Delta$ (e.g., $\Delta=3$ pixels) (step S204). In other words, starting from that side and going in the perpendicular direction, starting from the first encountered black pixel, N consecutive pixels are set to white (background). For convenience, the resulting image is referred to as the boundary-removed image for the respective side. If the image is a table, the result of the boundary removal step S204 is that the table boundary line closest to that side will be moved at most locations.

In an alternative embodiment, the size N of the boundary removal may be based on a distribution of individual line width value for all pixel positions along that side, such as the width value at a top percentile (e.g. top 10%) of the line width distribution. Other suitable values for N may be used, so long as it ensures that the lines or strokes closest to the side are sufficiently removed.

After the removal step, the side profile of the boundary-removed image for the selected side is re-calculated (step S204).

The steps of calculating average line width (Steps S203), and removing boundary and re-calculating side profile (step S204) are performed for all of the four sides (steps S205 and S206). Alternatively, steps S203 and S204 are performed for only one pair of opposing side profiles (top and bottom, or left and right).

Figure 7F:
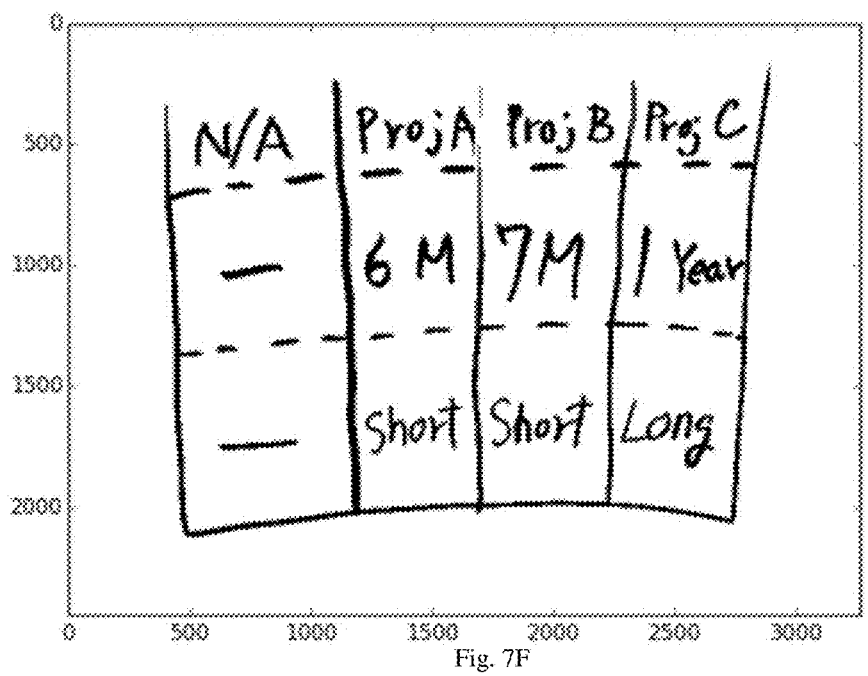
Figure 7G:
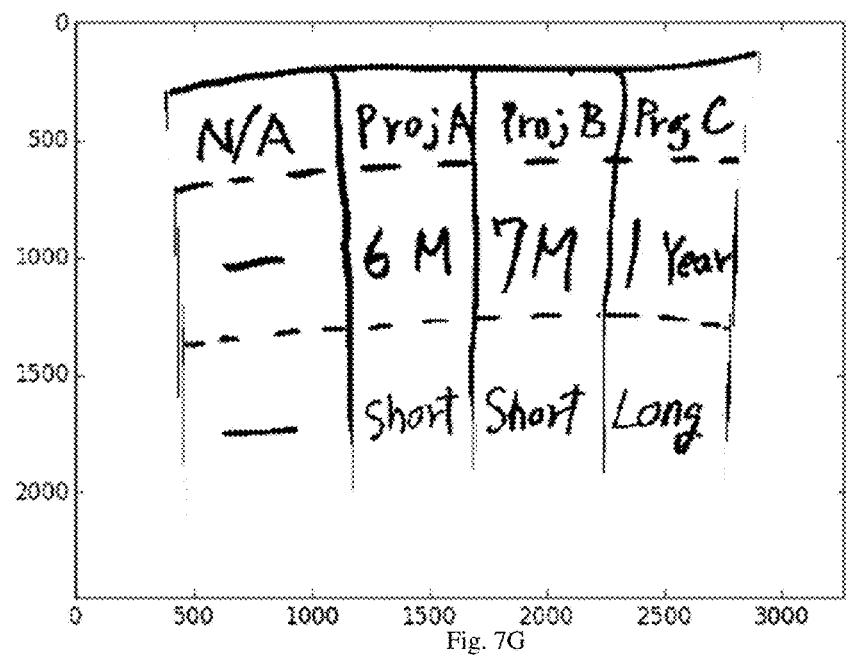
Figure 7H:
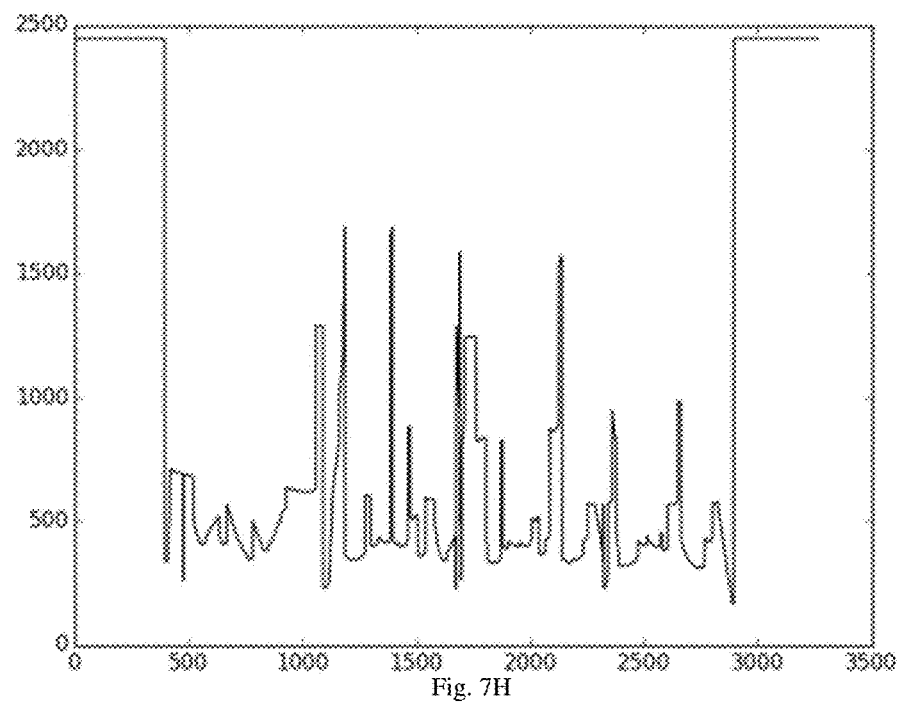
Figure 7I:
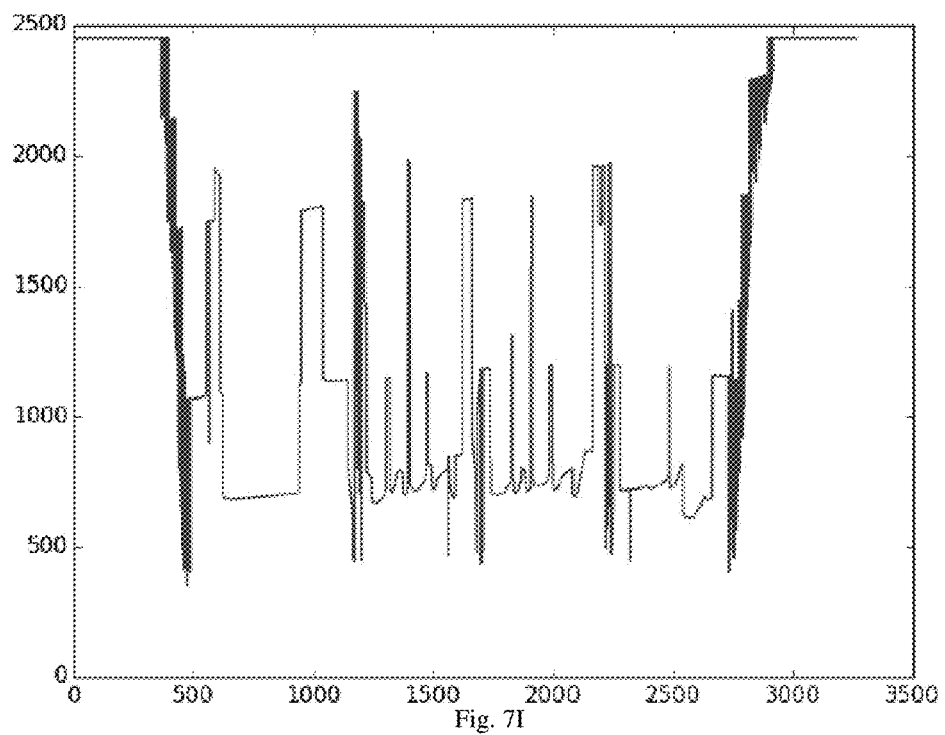

FIGS. 7F and 7G show examples of the images of FIG. 7A after top and bottom boundary removal. FIGS. 7H and 7I show examples of the re-calculated top and bottom profiles after top and bottom boundary removal.

Then, in steps S207 to S209, the original side profile (from step S102) and the corresponding re-calculated side profile (from step S204) are analyzed, for either one pair of opposing sides (left and right, or top an bottom) or both pairs of opposing sides, as follows.

In step S207, it is determined whether each re-calculated side profile is a smooth curve. The same methods as used in step S103 may be used to determine whether the re-calculated side profile is smooth. If all of re-calculated side profiles are non-smooth, the process continues to step S208; if not, i.e., some of the re-calculated side profiles are smooth, the image is determined not to be a table (step S211) and the process returns.

Figure 7J:
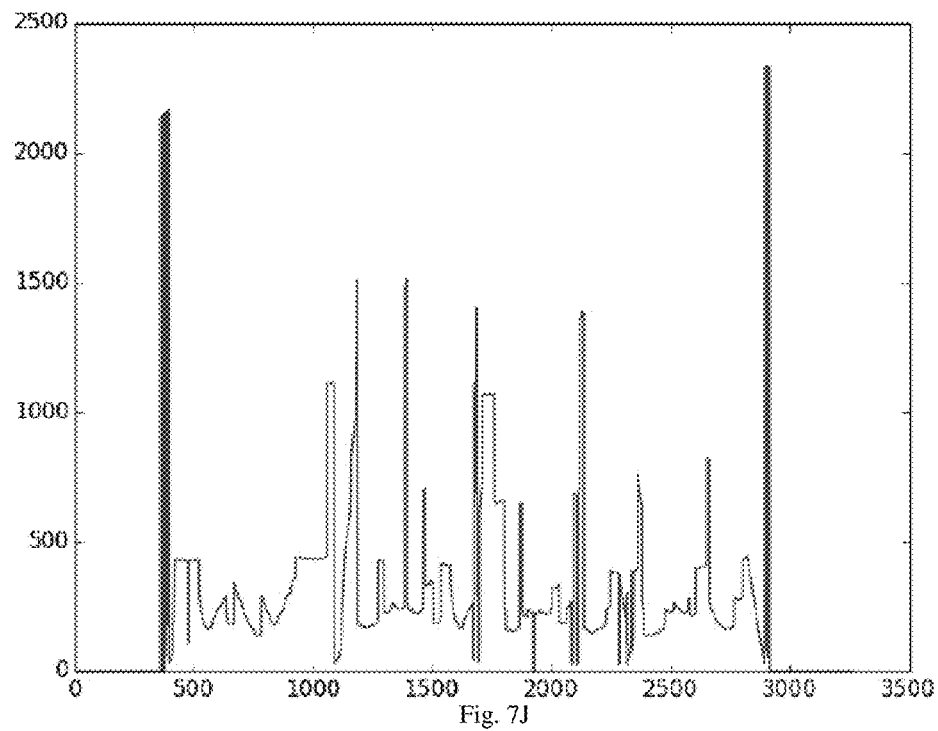
Figure 7K:
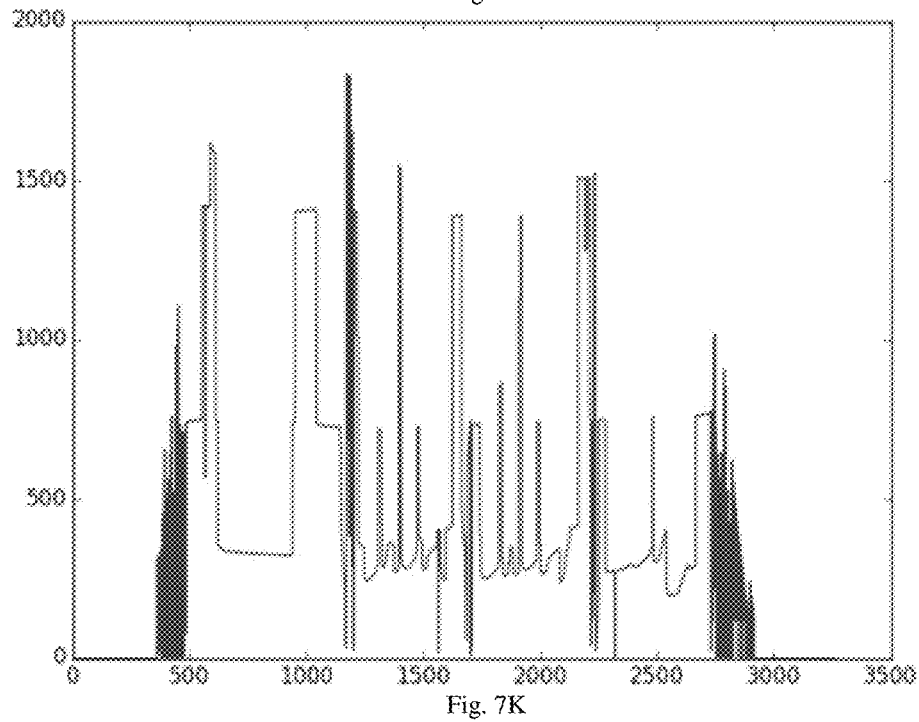

In step S208, for each side, the corresponding original side profile is subtracted from the re-calculated side profile to calculate a profile difference curve. FIGS. 7J and 7K show examples of the top and bottom profile difference curves. Generally speaking, if the image is a table, then the profile difference curve will be approximately zero at pixel positions where other table lines join the corresponding table boundary line from a perpendicular direction (i.e. the T-junctions mentioned above). At other pixel positions, the profile difference curve has positive values corresponding approximately to the distance between the table boundary and adjacent text or adjacent table lines.

Thus, in step S208, for the profile difference curve for each side, narrow valleys having near-zero values are identified. More specifically, in each profile difference curve, if at T1 or more consecutive pixel positions (for example, T1=2), the values of the profile difference curve are below a threshold value T2, the consecutive pixel positions is identified as a near-zero valley (NZV). The threshold value T2 may be equal to, for example, the average line width W calculated in step S203 plus the $\Delta$ value used in the boundary removal step S204 plus another small number such as 2 or 3 pixels.

In steps S209 and S210, the NZVs for two opposing sides are compared to determine whether the image is a table. In step S209, if the numbers of NZVs on the two sides are equal ("=0" in step S209), the image is recognized as a table (S212) and the process returns. If the difference between the two numbers is greater than a threshold T3 (for example, T3=3) (">3" in step S209), the image is recognized as not being a table (S211) and the process returns. If the difference between the two numbers is non-zero but not greater than T3, the locations of the two sets of NZVs (of the two sides) are compared to find pairs of NZVs from the two sets that correspond with each other in position (step S210). This step is to account for the possibility that some table may have merged cells.

Step S210 may be accomplished as follows. First, a relative shift in locations of the two sets of NZVs is calculated, e.g., by comparing the locations of the respective first NZVs from the two sets, or the respective last NZVs from the two sets, or the respective midpoints between the first and last NZVs from the two sets. The NZV locations for one side are corrected using the relative shift. This is to account for tables, particularly in hand-written tables, that have lines that are not strictly vertical or strictly horizontal. Then, for each NZV in a first set, for example the set having more NZVs, it is determined whether an NZV in the other set is present in a vicinity of an expected location corresponding to the location of that NZV in the first set. The vicinity may be, for example, a fraction (e.g. one half) of the distance between the NZV in the first set and its neighbors in both directions. If an NZV in the other set is present in the vicinity of the expected location, the two NZVs are deemed to match with each other. If the number of matching pairs of NZVs is greater than a threshold T4 ("yes" in step S210), the image is recognized as a table (S212) and the process returns. For example, the threshold T4 may be a fraction (e.g., 90%) of the total number (TN) of NZVs on the side having fewer NZVs, or equal to TN minus a small number (e.g. 3). Otherwise ("no" in step S210), the image is recognized as not a table (S211) and the process returns.

FIG. 7L schematically illustrates an example of two sets of NZVs in the top and bottom side profiles (represented by "+" marks in FIG. 7L), where each NZV on the top side matches with one on the bottom side, and some on the bottom side does not match any on the top side, which may be due to merged table cells in the top row of the table. This example also illustrates a relative shift between the NZVs for top and bottom sides.

Steps S209 and S210 may be performed for one or both pairs of sides, e.g., top and bottom sides only, left and right sides only, or both. Moreover, if steps S209 and S210 are performed for one pair of sides and the image is not recognized as a table, the steps may be performed for the other pair of sides and if the conditions in steps S209 and/or S210 are met by the other pair of sides, the image may be recognized as a table. For example, if a table contains many merged cells in the top row, step S209 performed for the top and bottom sides may result in the image being recognized as not a table; in such a case, steps S209 and S210 may be performed for the left and right side profiles, and as a result the image may be recognized as a table if the left-most and right-most columns do not contain too many merged cells.

Figure 3:
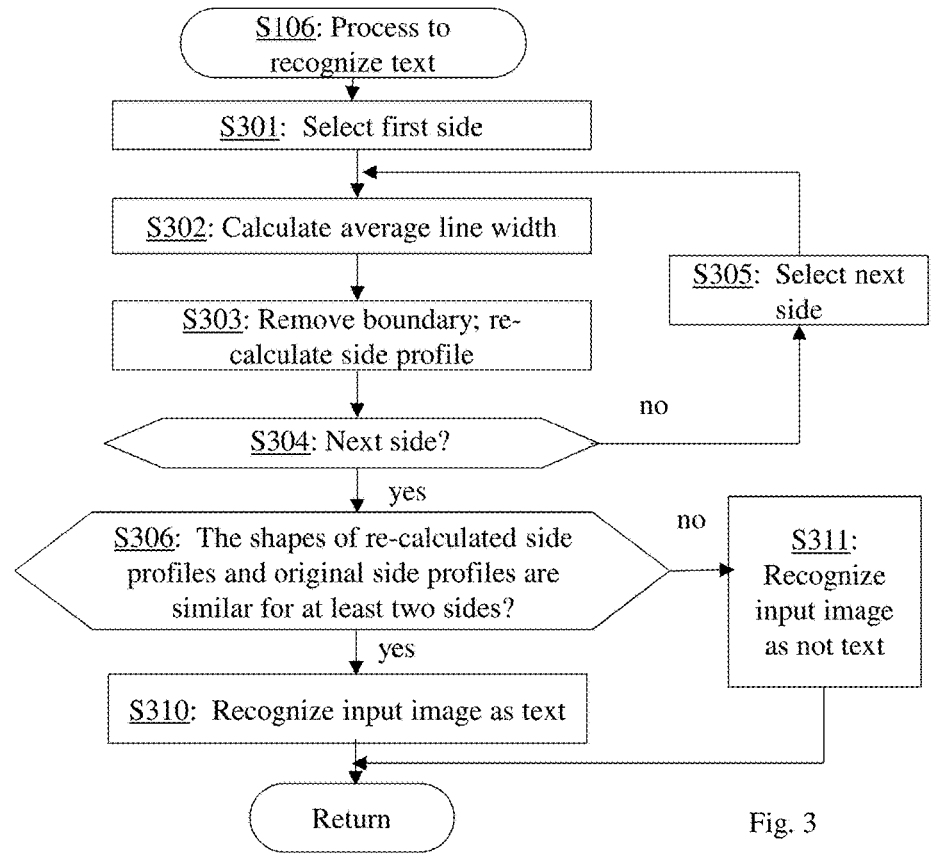

The process S106 for recognizing pure text is described next with reference to FIG. 3. In FIG. 3, steps S301 to S305 are identical to steps S202 to S206, i.e.: for each side, the average line width W is calculated, a boundary of size N=W+A is remove, and the side profile is re-calculated.

Figure 6F:
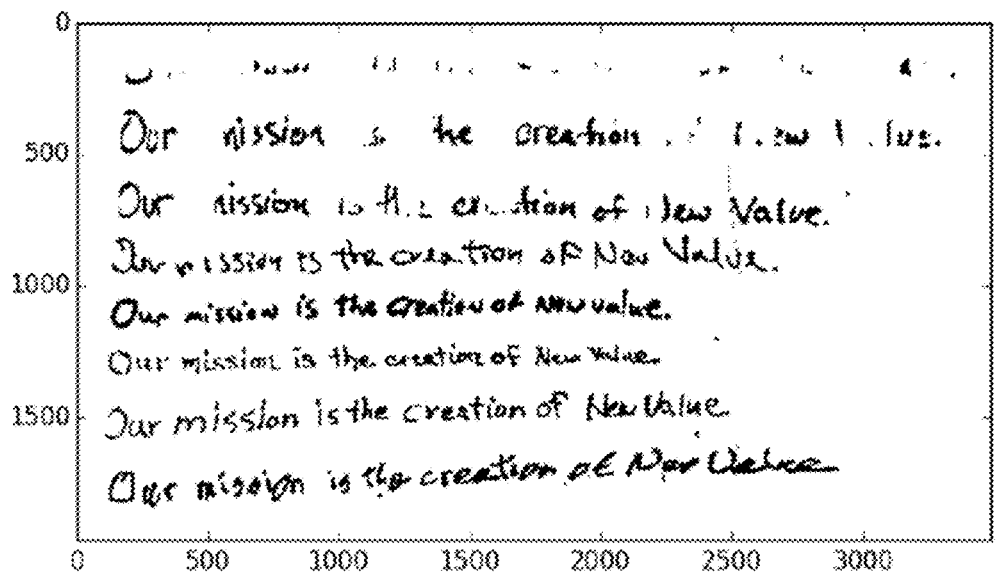
Figure 6G:
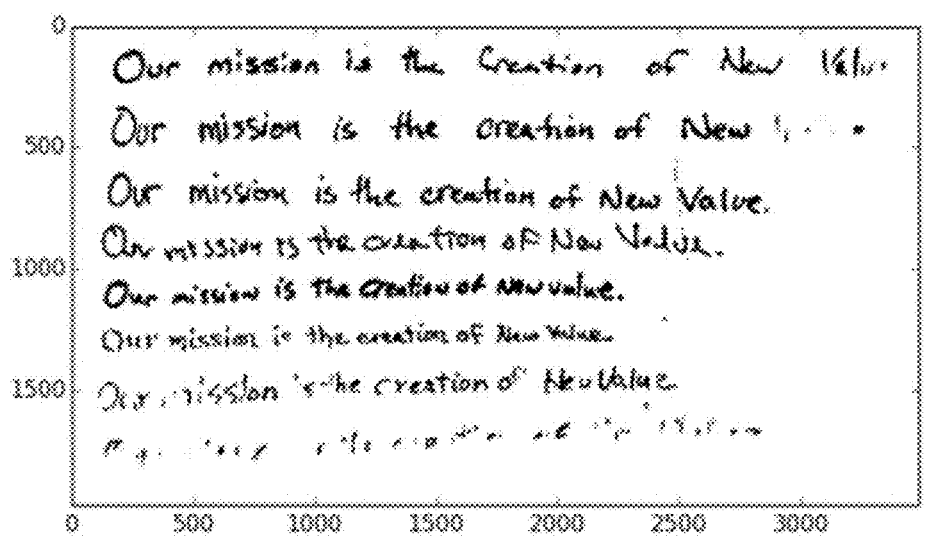
Figure 6H:
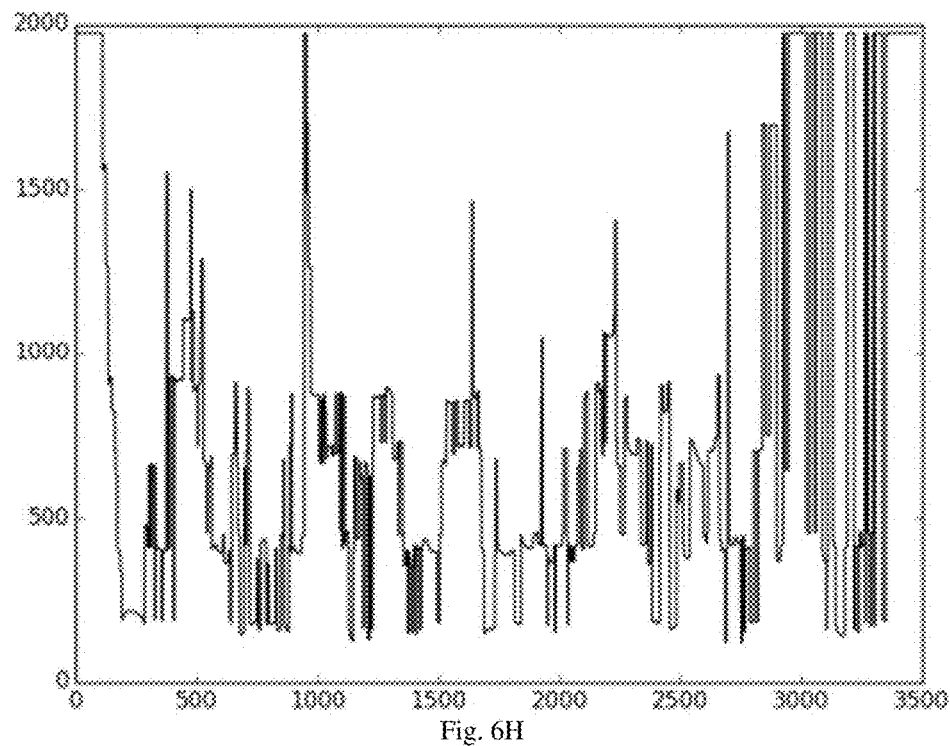
Figure 6I:
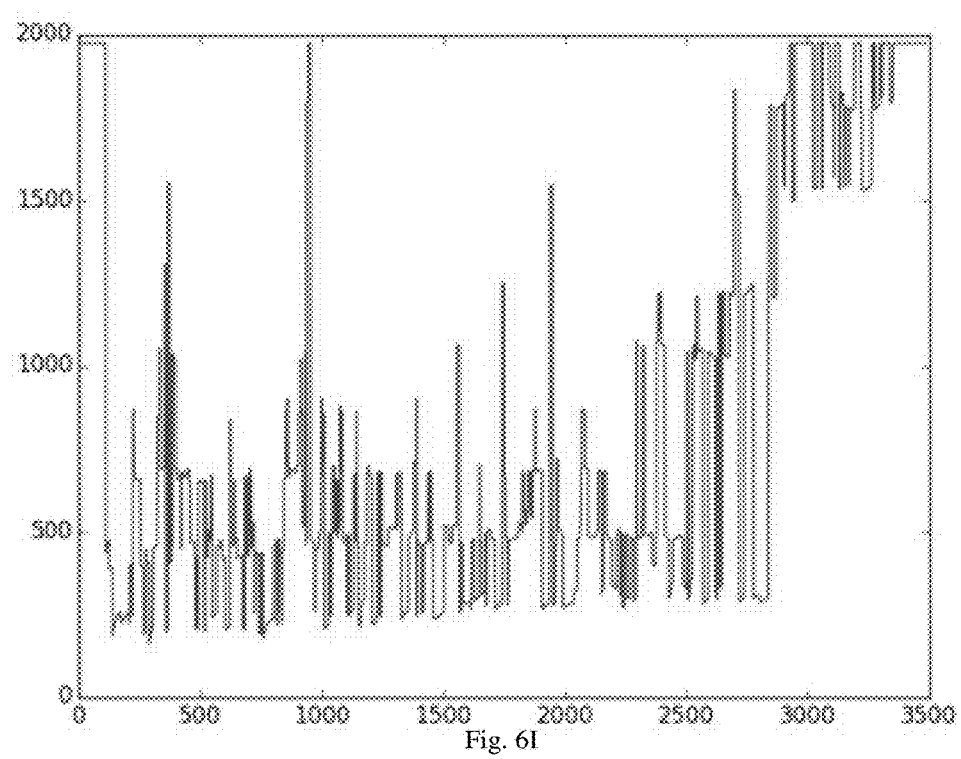

FIGS. 6F and 6G show examples of the images of FIG. 6A after top and bottom boundary removal. FIGS. 6H and 6I show examples of the re-calculated top and bottom profiles after top and bottom boundary removal.

For pure text, the removal step will only remove a part of the text characters closest to each side, so the re-calculated side profiles should generally have similar characteristics as the respective original side profiles. Therefore, in step S306, the re-calculated side profile and the original side profile for each side are compared, and if they are determined to be similar for at least two of the four sides, the image is determined to be text (step S310) and the process returns. Otherwise, the image is determined not to be text (step S311) and the process returns.

Figure 6J:
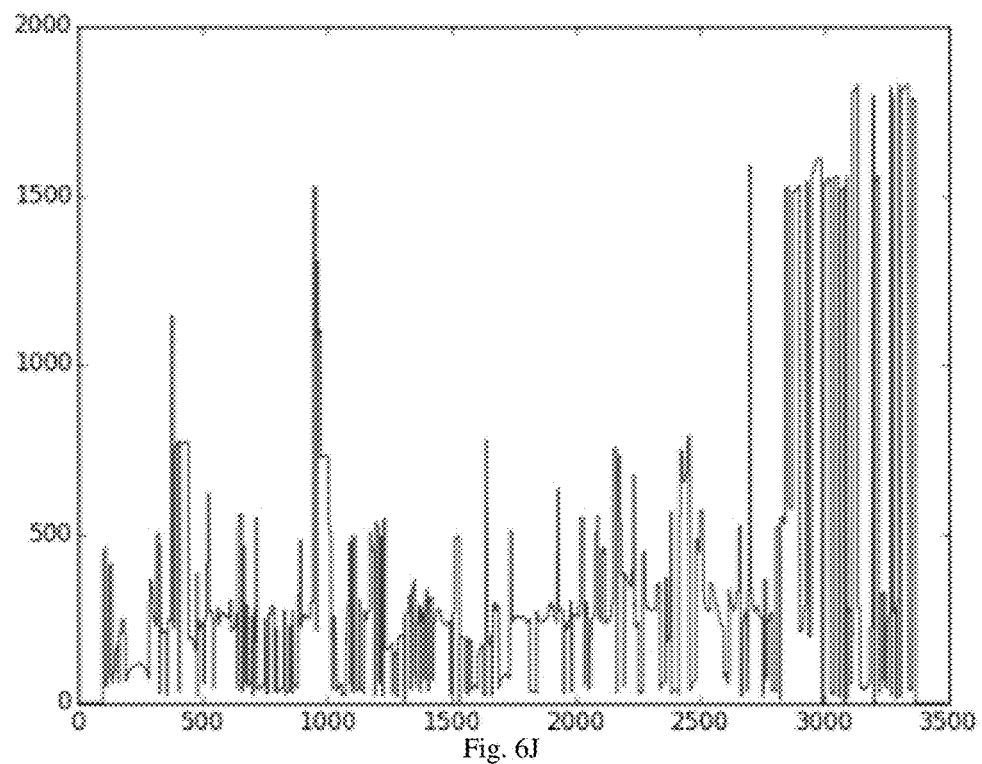
Figure 6K:
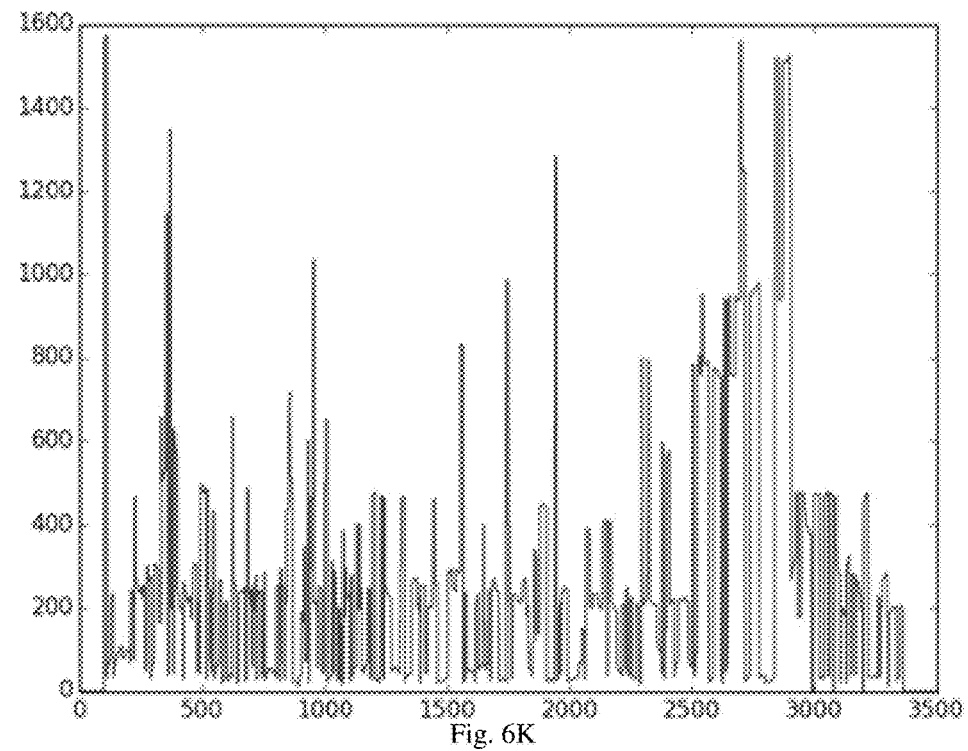

More specifically, step S306 includes the following steps, for each side. First, the re-calculated side profile is subtracted from the original side profile to generate a profile difference curve. FIGS. 6J and 6K show examples of the top and bottom profile difference curves. Then, the number of pixel positions where the profile difference curve has a value smaller than a threshold T5 is counted. The threshold T5 may be equal to, for example, the average line width W calculated in step S302 plus the Δ value used in the boundary removal step S303 plus another small number such as 2 pixels. If the counted number of pixel positions is greater than a threshold T6, the re-calculated side profile and the original side profile are considered similar. The threshold T6 may be, for example, 50% of the total number of pixels along that side (i.e., the image length or width).

Figure 3A:
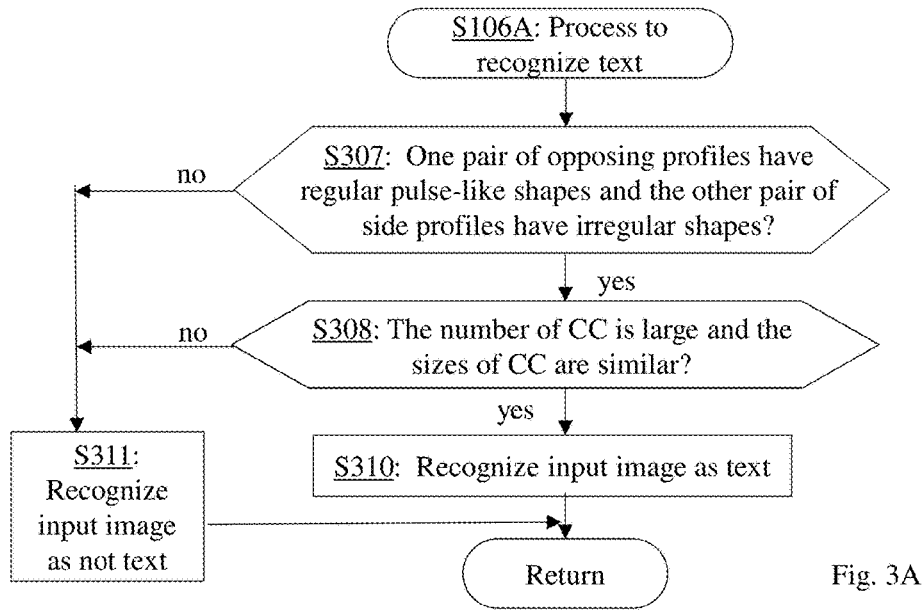

FIG. 3A shows an alternative process (step S106A) of recognizing text, which may be used instead of the process S106 shown in FIG. 3. This process recognizes text based on the assumption that a text image will contain lines of text that are spaced from each other at more or less equal intervals. Thus, for example, if the text image contains horizontal lines of text, the left and right side profiles will have more or less regular pulse-like shapes containing peaks corresponding to white spaces between lines and valleys corresponding to the location of the text lines, while the top and bottom side profile will not have such pulse-like shapes. An example may be seen in FIGS. 6D and 6E (left and right side profiles having regular pulse-like shape) vs. FIGS. 6B and 6C (top and bottom side profiles not having regular pulse-like shape).

In step S307, each of the four side profiles are evaluated to determine whether it has a regular pulse-like shape. The side profiles used in this step may be those calculated in step S102, or the re-calculated side profiles from step S204 if available.

More specifically, step S307 includes the following steps for each side profile. First, an average value of the side profile is calculated, while excluding areas having maximum or near-maximum profile values. Note that for left and right side profiles of text, the white spaces between text lines often result in areas of the profile having maximum values equal to the width of the entire document. These areas should be excluded when calculating the average of the side profile. This may be done by, for example, excluding the top few percentile (e.g., 5%) of the values, or excluding values that are within a threshold (e.g. 2% of pixels after first consecutive maximum values that equal to the width) from the document width.

The peaks are pixel positions where the profile values are above the average, and valleys are pixel positions where the profile values are below average. The pixel positions at zero down-crossing points, i.e. where the profile curve goes down and crosses the average value line, and zero up-crossing points, i.e. where the profile curve goes up and crosses the average value line, are identified. A plurality of zero down-crossing periods (ZDP), each being the distance between two adjacent zero down-crossing points, and a plurality of zero up-crossing periods (ZUP), each being the distance between two adjacent zero up-crossing points, are calculated. If the standard deviation of the plurality of ZDPs and the standard deviation of the plurality of ZUPs are both smaller than a threshold value (for example, 5%), the side profile is considered to have a regular pulse-like shape.

If it is determined in step S307 that one pair of opposing side profiles have irregular shapes and the other pair have regular pulse-like shapes, the image is considered a text candidate and the process continues to step S308. Otherwise, the image is determined not to be text (step S311) and the process returns.

In step S308, a connected component analysis is applied to the input image to identify all connected components of black color. In a binary image, a connected component is a collection of connected pixels having the same value (e.g. black). Each text character will be formed of one or more connected components. In step S308, if the total number of connected components identified in the image is large (for example, larger than 10 for each line) and the sizes of the connected components (as defined by the number of pixels in the connected component) are similar to each other (for example, the standard deviation of the sizes of all identified connected component is less than 20%), then the image is determined to be text (S310) and the process returns. Otherwise, the image is determined not to be text (step S311) and the process returns.

The process S108 for recognizing flowchart is described next with reference to FIG. 4. In process S108, the flowchart recognition algorithm is based on the following features often found in side profiles of a flowchart: Wide flat regions, corresponding to boundaries of rectangular or other shapes or connecting lines in the flowchart; sharp jumps, corresponding to the locations where a boundary ends; wide slanted regions, corresponding to boundaries of diamond shapes often found in flowcharts; etc. Such characteristics may be seen in the examples shown in FIGS. 5B-5E.

Figure 4:
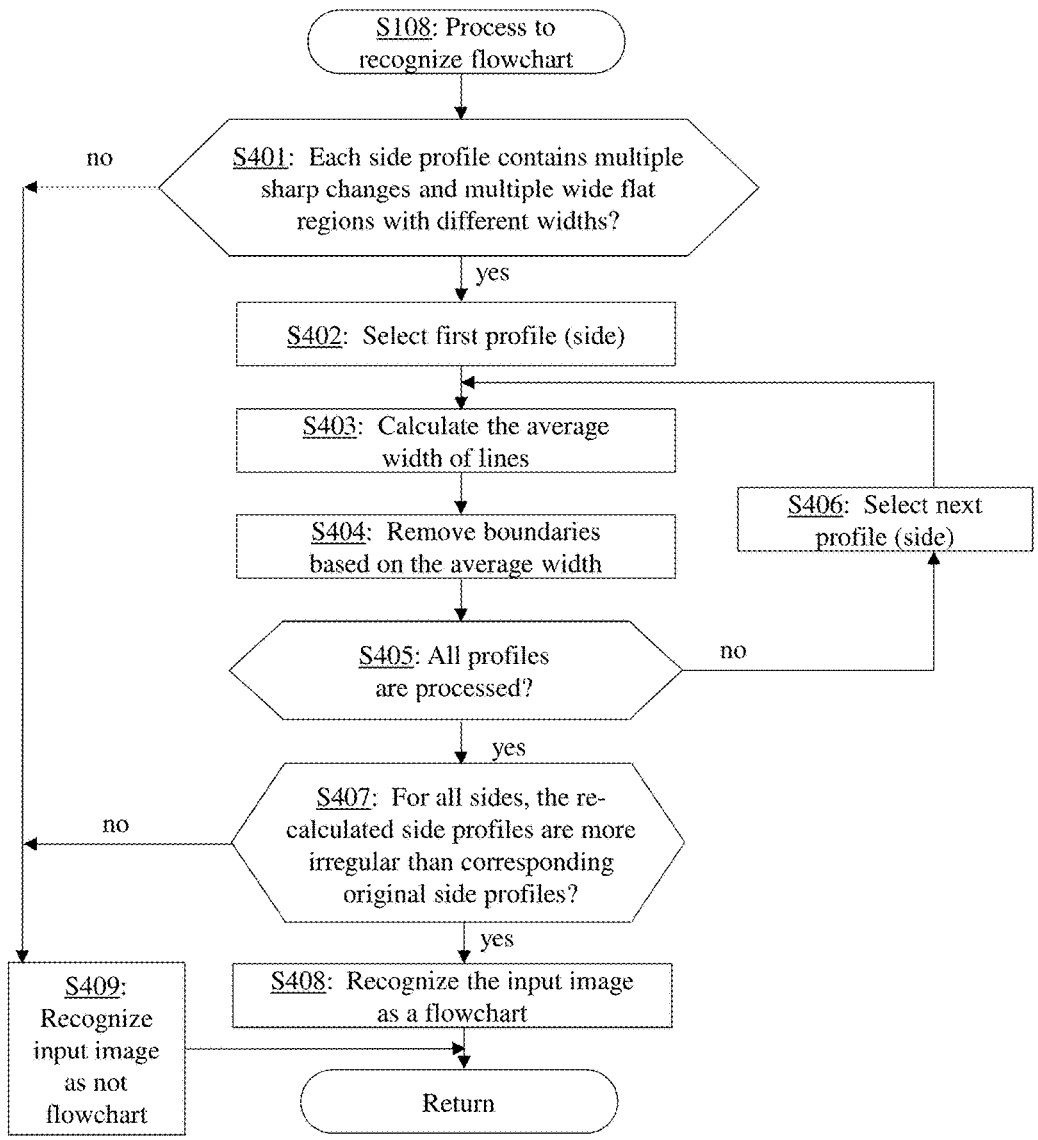

Referring to FIG. 4, it is first determined, for each side profile, whether the side profile contains multiple sharp changes and multiple wide flat regions having substantially different widths (S401). A sharp change may be defined as a section of the side profile where changes in profile values are greater than a threshold value (e.g. 10% of the width) within a pixel position range smaller than another threshold value (e.g. 2% of the width). A wide flat region may be defined as a section of the side profile wider than a threshold value (e.g. 10% of the width) where changes in profile value are less than a threshold value (e.g. 5% of the width). Sharp changes and wide flat regions may also be detected by calculating a derivative of the side profile. Peaks in the derivative curve that are higher than a threshold value (for example, 2) are identified as sharp changes in the side profile. Low valleys (for example, lower than 0.5) in the derivative curve that are wider than a threshold value (for example, 10% of the width) are identified as wide flat regions.

If each side profile contains both multiple sharp changes and multiple wide flat regions having substantially different widths ("yes" in step S401), the image is regarded as a flowchart candidate and process continues to step S402. Otherwise, the image is determined not to be a flowchart (step S409) and the process returns.

Steps S402 to S406 are identical to steps S202 to S206, i.e.: for each side, the average line width W is calculated, a boundary of size N=W+Δ is remove, and the side profile is re-calculated. The re-calculated side profile is subtracted from the original side profile to generate a profile difference curve.

Figure 5F:
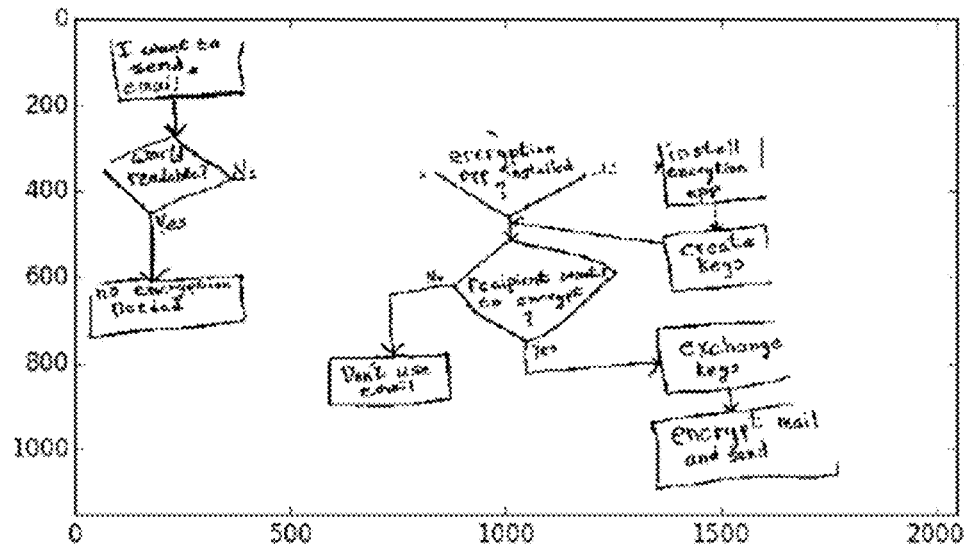
Figure 5G:
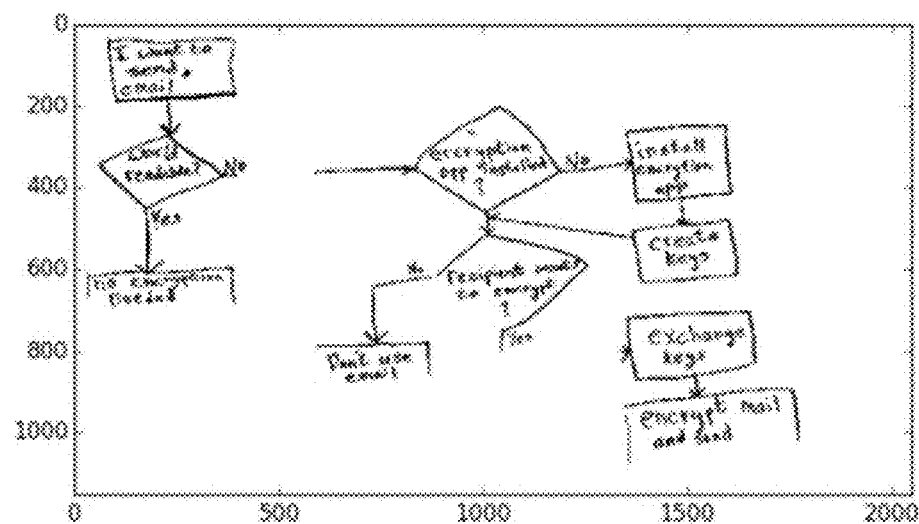
Figure 5H:
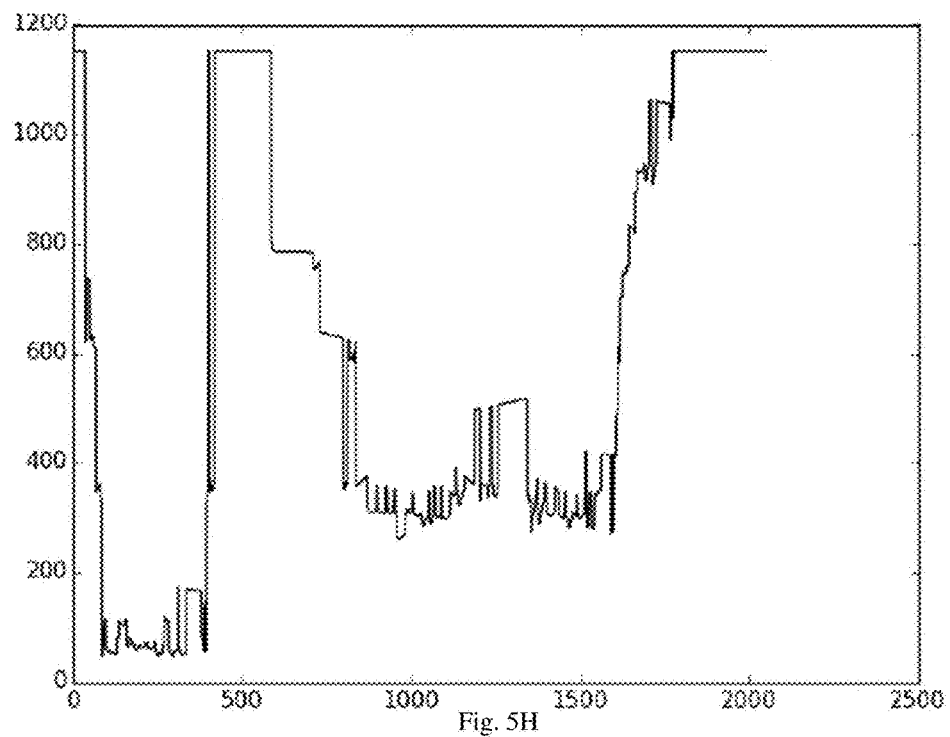
Figure 5I:
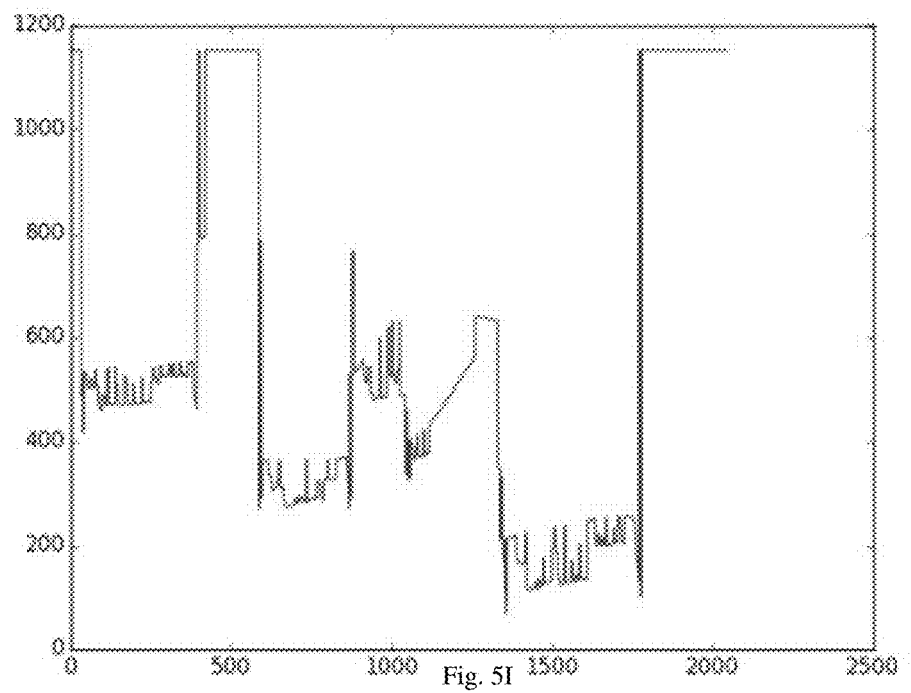

FIGS. 5F and 5G show examples of the images of FIG. 5A after top and bottom boundary removal. FIGS. 5H and 5I show examples of the re-calculated top and bottom profiles after top and bottom boundary removal. FIGS. 5I and 5K show examples of the top and bottom profile difference curves.

In step S407, if for all of the sides, the re-calculated side profile is more irregular than the corresponding original side profile (from step S102), the image is determined to be a flowchart (step S408) and the process returns. Otherwise, the image is determined not to be a flowchart (step S409) and the process returns.

More specifically, in step S407, if any one of following conditions occurs, the re-calculate side profile is deemed to be more irregular than the original side profile. (1) In a region where the original side profile is flat, the difference between the re-calculated side profile and the original side profile is large (for example, larger than 20% of the size of the image in the direction perpendicular to that side). For example, in the examples shown in FIGS. 5B and 5J, in the region around x=500 where the original profile (FIG. 5B) is flat, the profile difference curve (FIG. 5J) has large values. This corresponds to the fact that a horizontal connecting line in the flowchart is removed by the removing step S404.

(2) Compared to in the original side profile, the re-calculated side profile has more regions where the profile value is the maximum value (the maximum value is the size of the image in the direction perpendicular to that side). A region of maximum value occurs in a side profile when a stripe area of the image perpendicular to that side is completely blank. In the example shown in FIG. 5 F (or FIG. 5G), a vertical stripe around x=500 becomes completely blank due to the removal of the horizontal connecting line, and such regions of maximum value can be seen in the re-calculated profiles in FIGS. 5H and 5I.

In summary, the method described above can recognize whether a document image contains table, pure text or flowchart.

Figure 9:
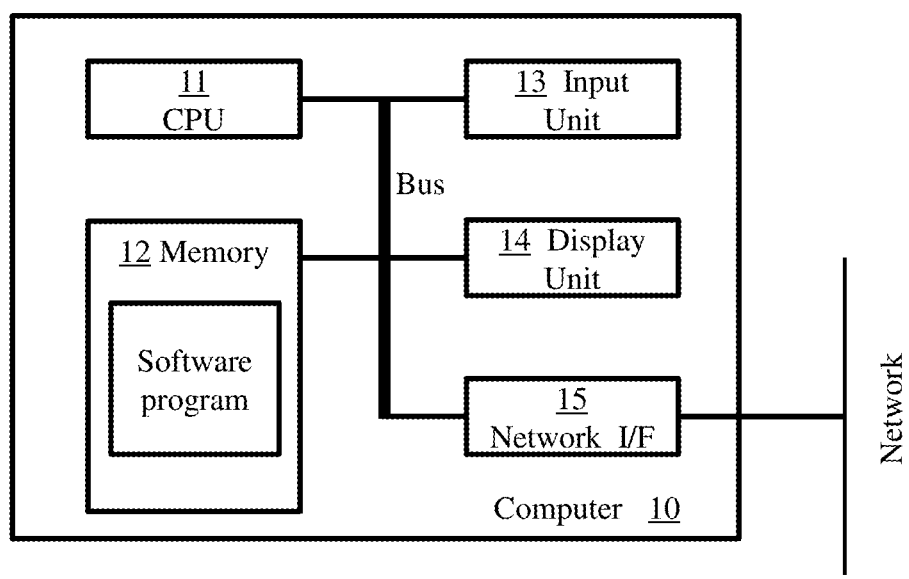
FIG. 9 schematically illustrates a computer apparatus in which embodiments of the present invention may be implemented.

The document image recognition methods described here can be implemented in a data processing system such as a computer 10 as shown in FIG. 9. The computer 10 comprises a processor (CPU) 11, a memory 12 which stores software programs, where the programs are executed by the processor 11 to carry out the described methods. The computer 10 may optionally contain an input unit 13, a display 14, and a network interface 15.

It will be apparent to those skilled in the art that various modification and variations can be made in the document image recognition method and related apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for recognizing an input document image as a table, pure text, or flowchart, the document image being a binary image where each pixel is a background pixel having a background pixel value or a content pixel having a content pixel value, the method comprising:

(a) calculating a side profile of the image for each of a top, bottom, left and right sides, each side profile being, for each pixel position along that side of the document image, a distance from that side to a first content pixel along a direction perpendicular to that side;

(b) calculating a boundary removal size N corresponding to each side based on line widths at a plurality of pixel positions along that side using content pixels closest to that side;

(c) for each side, removing a boundary of the size N from the document image by setting N consecutive pixels, starting from the first content pixel and going in the direction perpendicular to that side, to the background pixel value, to generate a boundary-removed image for that side;

(d) re-calculating a side profile for each of the top, bottom, left and right sides using the boundary-removed image for that side;

(e) based on a comparison of the side profiles and the re-calculated side profiles of some or all of the sides, recognizing the input document image as a table, pure text, a flowchart, or none of them.

2. The method of claim 1, wherein step (e) includes:
determining whether each side profile is a smooth curve or fits a straight line;
determining whether each re-calculated side profile is a smooth curve or fits a straight line;
calculating a profile difference curve for each side by subtracting the side profile for that side from the re-calculated side profile for that side;
detecting near-zero valleys of each profile difference curve, each near-zero valley being a region of the respective profile difference curve where values of the profile difference curve for at least T1 consecutive pixel position are below a value T2, T1 and T2 being predetermined threshold values; and
recognizing the input image as a table if: (1) each side profile is a smooth curve or fits a straight line, (2) none of the re-calculated side profiles is a smooth curve or fits a straight line, and (3) for at least one pair of profile difference curves of opposing sides, their respective numbers and locations of near-zero valleys agree with each other within predetermined criteria.

3. The method of claim 2, wherein the predetermined criteria are, for each pair of profile difference curves of opposing sides:
either the pair of profile difference curves have identical numbers of near-zero valleys,
or the pair of profile difference curves have numbers of near-zero valleys that are different from each other by no more than a threshold T3, and have more than a threshold T4 of matching pairs of near-zero valleys, each matching pair of near-zero valleys belonging respectively to the pair of profile difference curves and being located within predetermined vicinities from each other.

4. The method of claim 2, wherein the step of determining whether each side profile is a smooth curve or fits a straight line includes, for each side profile:
calculating $\Delta d(x)=|d(x+n)-d(x)|$, wherein x denotes a pixel position and d(x) denotes a value of that side profile at that pixel position, and n is a predetermined value;
determining the side profile to be a smooth curve if $\Delta d(x)$ for all x are less than a predetermined threshold D;
fitting the side profile to a straight line and calculating a cost function for the line fitting; and
determining that the side profile fits a straight line if the cost function is less than a predetermined threshold C.

5. The method of claim 1, wherein step (e) includes:
calculating a profile difference curve for each side by subtracting the side profile for that side from the re-calculated side profile for that side; and
recognizing the input image as pure text if, for each of least two of the sides, a number of pixel positions where the profile difference curve has a value smaller than a threshold T5 is greater than a threshold T6, wherein the threshold T5 is equal to the boundary removal size N plus a predetermined value, and wherein the threshold T6 is a predetermined fraction of a total number of pixels along that side.

6. The method of claim 1, wherein step (e) includes:
for each side profile, determining whether the side profile contains multiple sharp changes and multiple wide flat regions having substantially different widths;
calculating a profile difference curve for each side by subtracting the side profile for that side from the re-calculated side profile for that side; and
recognizing the input image as pure text if, for each of the sides, either (1) in a region corresponding to one of the wide flat regions of the side profile, the profile difference curve has values larger than a predetermined value, or (2) compared to the corresponding side profile, the re-calculated side profile has more regions where the re-calculated side profile value is a maximum profile value equal to a size of the image in the direction perpendicular to that side.

7. The method of claim 6,
wherein the side profile is determined to contain a sharp change if within a pixel position range smaller than a first threshold value, changes in values of the side profile are greater than a second threshold value, or if a derivative of the side profile has a peak higher than a third threshold value, and
wherein the side profile is determined to contain a wide flat region if within a pixel position range wider than a fourth threshold value, changes in values of the profile value are less than a fifth threshold value, or if the derivative of the side profile has a valley lower than a sixth threshold value and wider than a seventh threshold value.

8. The method of claim 1, wherein step (b) includes, for each side:
at each pixel position, calculating a line width by counting, starting from the first content pixel and going along the direction perpendicular to that side, a number of consecutive content pixels;
calculating an average value of the line widths at all pixel positions; and
setting the boundary removal size N for that side to be the average value plus a predetermined value.

9. The method of claim 8, wherein the average value is calculated after discarding a predetermined fraction of largest line widths and another predetermined fraction of smallest line widths.

10. The method of claim 1, wherein step (b) includes, for each side:
at each pixel position, calculating a line width by counting, starting from the first content pixel and going along the direction perpendicular to that side, a number of consecutive content pixels; and
setting the boundary removal size N for that side to be a value at a predetermined percentile of a distribution of the line widths for all pixel positions for that side.

11. A computer program product comprising a computer usable non-transitory medium having a computer readable program code embedded therein for controlling a data processing apparatus, the computer readable program code configured to cause the data processing apparatus to execute a process for recognizing an input document image as a table, pure text, or flowchart, the document image being a binary image where each pixel is a background pixel having a background pixel value or a content pixel having a content pixel value, the process comprising:

(a) calculating a side profile of the image for each of a top, bottom, left and right sides, each side profile being, for each pixel position along that side of the document image, a distance from that side to a first content pixel along a direction perpendicular to that side;

(b) calculating a boundary removal size N corresponding to each side based on line widths at a plurality of pixel positions along that side using content pixels closest to that side;

(c) for each side, removing a boundary of the size N from the document image by setting N consecutive pixels, starting from the first content pixel and going in the direction perpendicular to that side, to the background pixel value, to generate a boundary-removed image for that side;

(d) re-calculating a side profile for each of the top, bottom, left and right sides using the boundary-removed image for that side;

(e) based on a comparison of the side profiles and the re-calculated side profiles of some or all of the sides, recognizing the input document image as a table, pure text, a flowchart, or none of them.

12. The computer program product of claim 11, wherein step (e) includes:

determining whether each side profile is a smooth curve or fits a straight line;

determining whether each re-calculated side profile is a smooth curve or fits a straight line;

calculating a profile difference curve for each side by subtracting the side profile for that side from the re-calculated side profile for that side;

detecting near-zero valleys of each profile difference curve, each near-zero valley being a region of the respective profile difference curve where values of the profile difference curve for at least T1 consecutive pixel position are below a value T2, T1 and T2 being predetermined threshold values; and recognizing the input image as a table if: (1) each side profile is a smooth curve or fits a straight line, (2) none of the re-calculated side profiles is a smooth curve or fits a straight line, and (3) for at least one pair of profile difference curves of opposing sides, their respective numbers and locations of near-zero valleys agree with each other within predetermined criteria.

13. The computer program product of claim 12, wherein the predetermined criteria are, for each pair of profile difference curves of opposing sides:

either the pair of profile difference curves have identical numbers of near-zero valleys, or the pair of profile difference curves have numbers of near-zero valleys that are different from each other by no more than a threshold T3, and have more than a threshold T4 of matching pairs of near-zero valleys, each matching pair of near-zero valleys belonging respectively to the pair of profile difference curves and being located within predetermined vicinities from each other.

14. The computer program product of claim 12, wherein the step of determining whether each side profile is a smooth curve or fits a straight line includes, for each side profile:

calculating $\Delta d(x)=|d(x+n)-d(x)|$, wherein x denotes a pixel position and d(x) denotes a value of that side profile at that pixel position, and n is a predetermined value;

determining the side profile to be a smooth curve if $\Delta d(x)$ for all x are less than a predetermined threshold D;

fitting the side profile to a straight line and calculating a cost function for the line fitting; and determining that the side profile fits a straight line if the cost function is less than a predetermined threshold C.

15. The computer program product of claim 11, wherein step (e) includes:

calculating a profile difference curve for each side by subtracting the side profile for that side from the re-calculated side profile for that side; and recognizing the input image as pure text if, for each of least two of the sides, a number of pixel positions where the profile difference curve has a value smaller than a threshold T5 is greater than a threshold T6, wherein the threshold T5 is equal to the boundary removal size N plus a predetermined value, and wherein the threshold T6 is a predetermined fraction of a total number of pixels along that side.

16. The computer program product of claim 11, wherein step (e) includes:

for each side profile, determining whether the side profile contains multiple sharp changes and multiple wide flat regions having substantially different widths;

calculating a profile difference curve for each side by subtracting the side profile for that side from the re-calculated side profile for that side; and recognizing the input image as pure text if, for each of the sides, either (1) in a region corresponding to one of the wide flat regions of the side profile, the profile difference curve has values larger than a predetermined value, or (2) compared to the corresponding side profile, the re-calculated side profile has more regions where the re-calculated side profile value is a maximum profile value equal to a size of the image in the direction perpendicular to that side.

17. The computer program product of claim 16, wherein the side profile is determined to contain a sharp change if within a pixel position range smaller than a first threshold value, changes in values of the side profile are greater than a second threshold value, or if a derivative of the side profile has a peak higher than a third threshold value, and wherein the side profile is determined to contain a wide flat region if within a pixel position range wider than a fourth threshold value, changes in values of the profile value are less than a fifth threshold value, or if the derivative of the side profile has a valley lower than a sixth threshold value and wider than a seventh threshold value.

18. The computer program product of claim 11, wherein step (b) includes, for each side:

at each pixel position, calculating a line width by counting, starting from the first content pixel and going along the direction perpendicular to that side, a number of consecutive content pixels;

calculating an average value of the line widths at all pixel positions; and setting the boundary removal size N for that side to be the average value plus a predetermined value.

19. The computer program product of claim 18, wherein the average value is calculated after discarding a predetermined fraction of largest line widths and another predetermined fraction of smallest line widths.

20. The computer program product of claim 11, wherein step (b) includes, for each side:
   at each pixel position, calculating a line width by counting, starting from the first content pixel and going along the direction perpendicular to that side, a number of consecutive content pixels; and
   setting the boundary removal size N for that side to be a value at a predetermined percentile of a distribution of the line widths for all pixel positions for that side.

* * * * *